(12) United States Patent
Goldman et al.

(10) Patent No.: US 11,810,156 B2
(45) Date of Patent: *Nov. 7, 2023

(54) SYSTEMS, METHODS, AND DEVICES FOR COMPONENTIZATION, MODIFICATION, AND MANAGEMENT OF CREATIVE ASSETS FOR DIVERSE ADVERTISING PLATFORM ENVIRONMENTS

(71) Applicant: MediaMath, Inc., New York, NY (US)

(72) Inventors: Aaron Goldman, New York, NY (US); Daniel Robert Howard Bougourd, London (GB); Justin Michael Dougherty, New York, NY (US); Michael John Perreux, New York, NY (US); Cullinan B. Hartnett, Nevada City, CA (US); Wilfried A. Schobeiri, Chicago, IL (US); Ming-Lun Tung, Cambridge, MA (US)

(73) Assignee: MediaMath Acquisition Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,200

(22) Filed: May 12, 2022

(65) Prior Publication Data

US 2022/0383364 A1 Dec. 1, 2022

Related U.S. Application Data

(63) Continuation of application No. 16/270,189, filed on Feb. 7, 2019, now Pat. No. 11,348,142.

(Continued)

(51) Int. Cl.
*G06Q 30/0241* (2023.01)
*G06Q 50/00* (2012.01)
(Continued)

(52) U.S. Cl.
CPC ..... *G06Q 30/0276* (2013.01); *G06Q 30/0242* (2013.01); *G06Q 30/0277* (2013.01); *G06Q 30/08* (2013.01); *G06Q 50/01* (2013.01)

(58) Field of Classification Search
None
See application file for complete search history.

(56) References Cited

U.S. PATENT DOCUMENTS

| 5,923,902 A | 7/1999 | Inagaki |
| 5,983,227 A | 11/1999 | Nazem et al. |

(Continued)

FOREIGN PATENT DOCUMENTS

WO     WO 2014/074347     5/2014

OTHER PUBLICATIONS

"Mobile Advertisement System using Push Scheduling Based on User Preference" (Year: 2009).*

(Continued)

*Primary Examiner* — Victoria E. Frunzi
(74) *Attorney, Agent, or Firm* — Jones Day

(57) ABSTRACT

The present application describes systems, methods and devices for creative asset management, some of which can be utilized in closed/batch supply and/or open real-time bidding (RTB) supply opportunities. The present application further describes systems, methods and devices for omni-channel creative asset management that may have bi-directional features. In particular, in some embodiments, the creative asset management systems, methods, and devices described herein can allow advertisers to consolidate their online advertising efforts into a central platform.

16 Claims, 10 Drawing Sheets

Related U.S. Application Data

(60) Provisional application No. 62/628,056, filed on Feb. 8, 2018.

(51) Int. Cl.
*G06Q 30/08* (2012.01)
*G06Q 30/0242* (2023.01)

(56) References Cited

U.S. PATENT DOCUMENTS

| | | |
|---|---|---|
| 6,269,361 B1 | 7/2001 | Davis et al. |
| 6,285,983 B1 | 9/2001 | Jenkins |
| 6,327,574 B1 | 12/2001 | Kramar et al. |
| 6,430,539 B1 | 8/2002 | Lazarus et al. |
| 6,766,327 B2 | 7/2004 | Morgan et al. |
| 6,938,022 B1 | 8/2005 | Singhal |
| 6,941,376 B2 | 9/2005 | Mitchell et al. |
| 6,974,078 B1 | 12/2005 | Simon |
| 7,013,290 B2 | 3/2006 | Ananian |
| 7,069,258 B1 | 6/2006 | Campos |
| 7,139,723 B2 | 11/2006 | Conkwright et al. |
| 7,146,329 B2 | 12/2006 | Conkwright et al. |
| 7,197,472 B2 | 3/2007 | Conkwright et al. |
| 7,197,568 B2 | 3/2007 | Boure et al. |
| 7,203,909 B1 | 4/2007 | Horvitz |
| 7,219,078 B2 | 5/2007 | Lamont et al. |
| 7,236,941 B2 | 6/2007 | Conkwright et al. |
| 7,257,546 B2 | 8/2007 | Ebrahimi et al. |
| 7,523,087 B1 | 4/2009 | Agarwal et al. |
| 7,630,986 B1 | 12/2009 | Herz et al. |
| 7,685,232 B2 | 3/2010 | Gibbs et al. |
| 7,792,697 B2 | 9/2010 | Bhagchandani et al. |
| 7,805,332 B2 | 9/2010 | Wilson |
| 7,840,438 B2 | 11/2010 | Carson et al. |
| 7,848,950 B2 | 12/2010 | Herman et al. |
| 7,860,743 B2 | 12/2010 | Stevens |
| 7,996,296 B2 | 8/2011 | Lange |
| 8,001,004 B2 | 8/2011 | Protheroe et al. |
| 8,086,697 B2 | 12/2011 | Goulden et al. |
| 8,108,254 B2 | 1/2012 | Lin et al. |
| 8,117,067 B2 | 2/2012 | Ketchum |
| 8,117,199 B2 | 2/2012 | Ghani et al. |
| 8,160,977 B2 | 4/2012 | Poulin |
| 8,175,950 B1 | 5/2012 | Grebeck et al. |
| 8,255,285 B1 | 8/2012 | Peretz et al. |
| 8,255,489 B2 | 8/2012 | Agergan et al. |
| 8,375,046 B2 | 2/2013 | Dettinger et al. |
| 8,392,246 B2 | 3/2013 | Coladonato et al. |
| 8,527,342 B2 | 9/2013 | Feuerstein et al. |
| 8,548,909 B1 | 10/2013 | Snow et al. |
| 8,688,522 B2 | 4/2014 | Gern et al. |
| 8,782,249 B1 | 7/2014 | Hood |
| 8,972,530 B2 | 3/2015 | Agergan et al. |
| 9,047,612 B2 | 6/2015 | Anderson et al. |
| 9,076,166 B1 | 7/2015 | Peretz et al. |
| 9,135,655 B2 | 9/2015 | Buchalter et al. |
| 9,497,496 B1 | 11/2016 | Corley et al. |
| 10,191,972 B2 | 1/2019 | Maher et al. |
| 10,223,703 B2 | 3/2019 | Buchalter et al. |
| 10,332,156 B2 | 6/2019 | Buchalter et al. |
| 10,354,276 B2 | 7/2019 | Schobeiri et al. |
| 10,467,659 B2 | 11/2019 | Chalasani et al. |
| 10,592,910 B2 | 3/2020 | Buchalter |
| 10,628,859 B2 | 4/2020 | Buchalter et al. |
| 10,636,060 B2 | 4/2020 | Buchalter et al. |
| 11,049,118 B2 | 6/2021 | Buchalter |
| 2001/0037361 A1 | 11/2001 | Croy |
| 2001/0049620 A1 | 12/2001 | Blasko |
| 2001/0053995 A1 | 12/2001 | Nishimoto |
| 2002/0052825 A1 | 5/2002 | Bensemana |
| 2002/0055880 A1 | 5/2002 | Unold et al. |
| 2002/0059369 A1 | 5/2002 | Kern et al. |
| 2002/0065797 A1 | 5/2002 | Meidan et al. |
| 2002/0087573 A1 | 7/2002 | Reuning et al. |
| 2002/0087967 A1 | 7/2002 | Conkwright et al. |
| 2002/0103698 A1 | 8/2002 | Cantrell |
| 2002/0116491 A1 | 8/2002 | Boyd et al. |
| 2002/0133490 A1 | 9/2002 | Conkwright et al. |
| 2002/0188508 A1 | 12/2002 | Lee et al. |
| 2002/0194434 A1 | 12/2002 | Kurasugi |
| 2003/0018550 A1 | 1/2003 | Rotman et al. |
| 2003/0023489 A1 | 1/2003 | McGuire et al. |
| 2003/0033202 A1 | 2/2003 | Ogawa et al. |
| 2003/0101454 A1 | 5/2003 | Ozer et al. |
| 2003/0135464 A1 | 7/2003 | Mourad et al. |
| 2003/0149622 A1 | 8/2003 | Singh et al. |
| 2003/0208754 A1 | 11/2003 | Sridhar et al. |
| 2004/0054589 A1 | 3/2004 | Nicholas et al. |
| 2004/0073553 A1 | 4/2004 | Brown et al. |
| 2004/0083133 A1 | 4/2004 | Nicholas et al. |
| 2004/0123247 A1 | 6/2004 | Wachen et al. |
| 2004/0215501 A1 | 10/2004 | D'omano |
| 2004/0225562 A1 | 11/2004 | Turner |
| 2005/0027593 A1 | 2/2005 | Wilson |
| 2005/0038700 A1* | 2/2005 | Doemling .......... G06Q 30/0601 705/26.1 |
| 2005/0080775 A1 | 4/2005 | Colledge et al. |
| 2005/0105513 A1 | 5/2005 | Sullivan et al. |
| 2005/0125289 A1 | 6/2005 | Beyda et al. |
| 2005/0144065 A1 | 6/2005 | Calabria et al. |
| 2005/0144072 A1 | 6/2005 | Perkowski et al. |
| 2005/0144073 A1 | 6/2005 | Morrisroe et al. |
| 2005/0159921 A1 | 7/2005 | Louviere et al. |
| 2005/0171843 A1 | 8/2005 | Brazell et al. |
| 2005/0188400 A1 | 8/2005 | Topel |
| 2005/0197954 A1 | 9/2005 | Maitland et al. |
| 2005/0216339 A1 | 9/2005 | Brazell et al. |
| 2005/0235030 A1 | 10/2005 | Lauckhart et al. |
| 2005/0240354 A1 | 10/2005 | Mamou et al. |
| 2005/0251444 A1 | 11/2005 | Varian et al. |
| 2005/0281082 A1 | 11/2005 | Lewin |
| 2005/0273388 A1 | 12/2005 | Roetter |
| 2006/0026067 A1 | 2/2006 | Nicholas et al. |
| 2006/0031301 A1 | 2/2006 | Herz et al. |
| 2006/0041661 A1 | 2/2006 | Erikson et al. |
| 2006/0128469 A1 | 6/2006 | Willis et al. |
| 2006/0212350 A1 | 9/2006 | Ellis et al. |
| 2006/0224447 A1 | 10/2006 | Koningstein |
| 2006/0253323 A1 | 11/2006 | Phan et al. |
| 2007/0033105 A1 | 2/2007 | Collins et al. |
| 2007/0033269 A1 | 2/2007 | Alkinson et al. |
| 2007/0033532 A1 | 2/2007 | Lemelson |
| 2007/0050244 A1 | 3/2007 | Stevens |
| 2007/0061195 A1 | 3/2007 | Liu et al. |
| 2007/0118796 A1 | 5/2007 | Nazem et al. |
| 2007/0143171 A1 | 6/2007 | Boyd et al. |
| 2007/0150353 A1 | 6/2007 | Krassner et al. |
| 2007/0156524 A1 | 7/2007 | Grouf et al. |
| 2007/0157245 A1 | 7/2007 | Collins |
| 2007/0192356 A1 | 8/2007 | O'Kelley |
| 2007/0198350 A1 | 8/2007 | O'Kelley et al. |
| 2007/0214037 A1 | 9/2007 | Shubert et al. |
| 2007/0265923 A1 | 11/2007 | Krassner et al. |
| 2007/0271392 A1 | 11/2007 | Khopkar et al. |
| 2007/0271501 A1 | 11/2007 | Vasilik |
| 2007/0271511 A1 | 11/2007 | Khopkar et al. |
| 2008/0004954 A1 | 1/2008 | Horvitz |
| 2008/0021778 A1 | 1/2008 | Perkowski et al. |
| 2008/0052278 A1 | 2/2008 | Zlotin et al. |
| 2008/0052413 A1 | 2/2008 | Wang et al. |
| 2008/0086380 A1 | 4/2008 | Cohen et al. |
| 2008/0097832 A1 | 4/2008 | Lee et al. |
| 2008/0103792 A1 | 5/2008 | Flake et al. |
| 2008/0103795 A1 | 5/2008 | Jakubowski et al. |
| 2008/0103799 A1 | 5/2008 | Domenikos et al. |
| 2008/0103800 A1 | 5/2008 | Domenikos et al. |
| 2008/0103895 A1 | 5/2008 | Burdick et al. |
| 2008/0103896 A1 | 5/2008 | Flake et al. |
| 2008/0103902 A1 | 5/2008 | Burdick et al. |
| 2008/0103903 A1 | 5/2008 | Flake et al. |
| 2008/0103947 A1 | 5/2008 | Flake et al. |
| 2008/0109376 A1 | 5/2008 | Walsh et al. |
| 2008/0162574 A1 | 7/2008 | Gilbert |
| 2008/0189175 A1 | 8/2008 | Chan |

(56) References Cited

U.S. PATENT DOCUMENTS

| | | |
|---|---|---|
| 2008/0249855 A1 | 10/2008 | Collins et al. |
| 2008/0255922 A1 | 10/2008 | Feldman et al. |
| 2008/0256061 A1 | 10/2008 | Chang et al. |
| 2008/0262907 A1 | 10/2008 | Broady et al. |
| 2008/0275757 A1 | 11/2008 | Sharma et al. |
| 2008/0313027 A1 | 12/2008 | Jain et al. |
| 2009/0002852 A1 | 1/2009 | Wang |
| 2009/0012852 A1 | 1/2009 | O'Kelley et al. |
| 2009/0063250 A1 | 3/2009 | Burgess |
| 2009/0083145 A1 | 3/2009 | Lee |
| 2009/0098891 A1 | 4/2009 | Park et al. |
| 2009/0112629 A1 | 4/2009 | Leiper |
| 2009/0150362 A1 | 6/2009 | Evenhaim |
| 2009/0216619 A1 | 8/2009 | Tavernier |
| 2009/0228397 A1 | 9/2009 | Tawakol et al. |
| 2009/0327006 A1 | 12/2009 | Hansan |
| 2010/0023863 A1 | 1/2010 | Cohen-Martin |
| 2010/0042497 A1 | 2/2010 | Pritchard et al. |
| 2010/0049802 A1 | 2/2010 | Softky |
| 2010/0070322 A1 | 3/2010 | Lahale et al. |
| 2010/0082402 A1 | 4/2010 | Kantak et al. |
| 2010/0082429 A1 | 4/2010 | Samdadiya et al. |
| 2010/0094758 A1 | 4/2010 | Chamberlain et al. |
| 2010/0100407 A1 | 4/2010 | Lin et al. |
| 2010/0114716 A1 | 5/2010 | Heilig et al. |
| 2010/0145763 A1 | 6/2010 | Swanson |
| 2010/0185516 A1 | 7/2010 | Swanson et al. |
| 2010/0191558 A1 | 7/2010 | Chickering et al. |
| 2010/0228634 A1 | 9/2010 | Ghosh et al. |
| 2010/0250332 A1 | 9/2010 | Ghosh et al. |
| 2010/0268603 A1 | 10/2010 | Nolet et al. |
| 2010/0268609 A1 | 10/2010 | Nolet et al. |
| 2011/0035259 A1 | 2/2011 | Das et al. |
| 2011/0035287 A1 | 2/2011 | Fox |
| 2011/0055009 A1 | 3/2011 | Kiversis |
| 2011/0078143 A1 | 3/2011 | Aggarwal |
| 2011/0119125 A1 | 5/2011 | Javangula et al. |
| 2011/0145570 A1 | 6/2011 | Gressel et al. |
| 2011/0191714 A1 | 8/2011 | Ting et al. |
| 2011/0213659 A1 | 9/2011 | Fontoura et al. |
| 2011/0225037 A1 | 9/2011 | Tunca et al. |
| 2011/0231264 A1 | 9/2011 | Dilling et al. |
| 2011/0246298 A1 | 10/2011 | Williams et al. |
| 2011/0246310 A1 | 10/2011 | Buchalter et al. |
| 2011/0251875 A1 | 10/2011 | Cosman |
| 2011/0276389 A1 | 11/2011 | Kulkarni et al. |
| 2011/0313757 A1 | 12/2011 | Hoover et al. |
| 2012/0041816 A1 | 2/2012 | Buchalter |
| 2012/0129525 A1 | 5/2012 | Pazhyannur et al. |
| 2012/0215607 A1 | 8/2012 | Brereton, II et al. |
| 2012/0226560 A1 | 9/2012 | Chang et al. |
| 2012/0253928 A1 | 10/2012 | Jackson et al. |
| 2012/0323674 A1 | 12/2012 | Simmons et al. |
| 2013/0124316 A1 | 5/2013 | Kiversis |
| 2013/0124669 A1 | 5/2013 | Anderson et al. |
| 2013/0185039 A1 | 7/2013 | Tesauro et al. |
| 2013/0276009 A1 | 10/2013 | Ajitomi et al. |
| 2013/0346597 A1 | 12/2013 | Baumback et al. |
| 2014/0059343 A1 | 2/2014 | Mohajeri et al. |
| 2014/0082660 A1 | 3/2014 | Zhang et al. |
| 2014/0108139 A1 | 4/2014 | Weinstein |
| 2014/0143032 A1 | 5/2014 | Tomlin et al. |
| 2014/0156416 A1* | 6/2014 | Goenka .............. G06Q 30/0276 705/14.66 |
| 2014/0201007 A1 | 7/2014 | Stack et al. |
| 2014/0222593 A1 | 8/2014 | Cosman |
| 2014/0279595 A1 | 9/2014 | Senaratna et al. |
| 2015/0051986 A1 | 2/2015 | Saifee et al. |
| 2015/0066793 A1 | 3/2015 | Brown |
| 2015/0193818 A1 | 7/2015 | Turner et al. |
| 2015/0242379 A1 | 8/2015 | Kuivinen et al. |
| 2015/0347353 A1 | 12/2015 | Turner et al. |
| 2015/0348141 A1 | 12/2015 | Parker et al. |
| 2016/0071168 A1 | 3/2016 | Buchalter et al. |
| 2016/0170567 A1 | 6/2016 | Hunter et al. |
| 2016/0316240 A1 | 10/2016 | Hirsch et al. |
| 2017/0052652 A1 | 2/2017 | Denton et al. |
| 2017/0330245 A1 | 11/2017 | Guermas et al. |
| 2018/0040032 A1 | 2/2018 | Chalasani et al. |
| 2018/0158111 A1* | 6/2018 | Zgliczynski ....... G06Q 30/0276 |
| 2018/0189843 A1 | 7/2018 | Kulkarni et al. |
| 2019/0206900 A1 | 7/2019 | Buchalter |
| 2019/0244257 A1 | 8/2019 | Goldman et al. |
| 2019/0340655 A1 | 11/2019 | Buchalter et al. |
| 2019/0347693 A1 | 11/2019 | Schobeiri et al. |
| 2019/0347697 A1 | 11/2019 | Chalasani et al. |
| 2019/0373077 A1 | 12/2019 | Lepore et al. |
| 2020/0160388 A1 | 5/2020 | Sabeg et al. |
| 2021/0090126 A1 | 3/2021 | Schobeiri et al. |
| 2021/0125223 A1 | 4/2021 | Schobeiri et al. |

OTHER PUBLICATIONS

Google, A Revolution in Measuring Ad Effectiveness: Knowing Who Would have Been Exposed, 2015.

International Preliminary Report on Patentability dated Jan. 31, 2013 in PCT Application No. PCT/US2011/044386.

International Search Report and Written Opinion dated Jan. 27, 2012 in PCT Application No. PCT/US2011/030587.

International Search Report and Written Opinion dated Jan. 9, 2012 in PCT Application No. PCT/US2011/044386.

International Search Report and Written Opinion dated Feb. 24, 2014 in PCT Application No. PCT/US13/67330.

International Search Report and Written Opinion PCT/US11/43231 dated Jan. 19, 2012.

Sweeney, "How Real-Time Bidding (RTB) Changed Online Display Advertising", Clearcode Blog, Jan. 8, 2015 https://clearcode.cc/blog/real-time-bidding-online-display-advertising/[Feb. 3, 2021 11:48:43 AM].

* cited by examiner

SYSTEMS, METHODS, AND DEVICES FOR COMPONENTIZATION, MODIFICATION, AND MANAGEMENT OF CREATIVE ASSETS FOR DIVERSE ADVERTISING PLATFORM ENVIRONMENTS

CROSS-REFERENCE TO RELATED APPLICATION(S)

The present application is a continuation of U.S. patent application Ser. No. 16/270,189, filed Feb. 7, 2019, which claims the benefit under 35 U.S.C. § 119(c) of U.S. Provisional Patent Application No. 62/628,056, filed Feb. 8, 2018, which are incorporated herein by reference in their entireties 37 C.F.R. § 1.57. Any and all applications for which a foreign or domestic priority claim is identified in the Application Data Sheet as filed with the present application are hereby incorporated by reference under 37 C.F.R. § 1.57.

BACKGROUND

Field

The present application relates generally to the field of creative asset management, and more specifically to systems, methods, and devices for managing creative assets.

Description

Online advertising, online marketing, Internet advertising, and/or web advertising, is a commonly used form of marketing and advertising which uses the Internet to deliver promotional marketing messages to consumers. There are many different forms of online advertising, including, for example, email marketing, search engine marketing (SEM), social media marketing, many types of display advertising (including web banner advertising), and/or mobile advertising. Online advertising generally involves a publisher or opportunity provider, who integrates advertisements into its online content (e.g. Facebook, CNN, Twitter), and an advertiser, who provides the creatives advertisements to be displayed on the opportunity provider's content. Other potential participants include advertising agencies who help generate and place the creative asset, and/or ad server which technologically delivers the creative and may track statistics.

There are many benefits of online advertising compared to traditional advertisement methods. The low costs of electronic communication reduce the cost of displaying online advertisements compared to offline ads. Additionally, online advertising, and in particular social media, provides a low-cost means for advertisers to engage with many large and established communities.

Also, advertisers have a wide variety of ways of presenting their promotional messages, including the ability to convey images, video, audio, and links. Unlike many offline ads, online ads may also be interactive. For example, some ads let users input queries, let users follow the advertiser on social media, or even play games.

However, the flexibility, multitude of advertising platforms, and high speed of deployment of online advertisements causes additional problems that have not yet been adequately addressed. Integration of multi-formatted creative assets with the huge amount of internet ad impression opportunity platforms is not seamless. Each platform has their own rules and technical limitations, which may need to be satisfied in order for an advertisement to be displayed properly and given permission to be displayed on the platform. Previously, advertisement creators needed to create many different forms of the advertisement, such that the advertisement could be displayed on different platforms and/or within impression opportunities with different requirements on the same platform.

Thus, new systems, methods, and devices for componentization, modification, and management of creative assets for diverse advertising platform environments is needed.

SUMMARY

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

In some embodiments, a computer-implemented method for preview, modification, and management of creative assets for diverse advertising platform environments comprises: receiving, by a creative asset management system from a user, a selection of one or more creative asset components for generating a creative asset to be placed on an advertisement impression opportunity, wherein the one or more creative asset components are stored on a creative asset database in electronic communication with the creative asset management system; retrieving, by the creative asset management system from the creative asset database, the one or more creative asset components; generating, by the creative asset management system, the creative asset to be placed on the advertisement impression opportunity based at least in part on the selected and retrieved one or more creative asset components, wherein each of the one or more creative asset components comprises a constituent part of the creative asset, and wherein each of the one or more creative asset components comprises one or more component parameters; attaining, by the creative asset management system from a supply source of the advertisement impression opportunity, one or more supply source rules for the advertisement impression opportunity, wherein the supply source comprises an online location serving as a source of the advertisement impression opportunity, wherein each of the one or more supply source rules comprises a predetermined requirement for at least one component parameter of the one or more creative asset components; dynamically generating, by the creative asset management system, an analysis report for the creative asset, the analysis report comprising a classification of compliance of each of the one or more creative asset components with each of the one or more supply source rules; displaying, via a dynamic user interface of the creative asset management system, the analysis report to the user; and displaying, via the dynamic user interface of the creative asset management system, an option to the user to request to place the creative asset on the advertisement impression opportunity when the classification of compliance of each of the one or more creative asset components with each of the one or more supply source rules of the dynamically generated analysis report is above a predetermined threshold, wherein the creative asset management system comprises a computer processor and an electronic storage medium.

In some embodiments, the computer-implemented method further comprises determining compliance of the generated creative asset with each of the one or more supply source rules, wherein the determining compliance comprises comparing the one or more supply source rules with the at least one corresponding component parameter of the one or more creative asset components. In some embodiments of the computer-implemented method, the determining compliance of the generated creative asset with each of the one or more supply source rules is performed by the creative asset management system. In some embodiments of the computer-implemented method, the determining compliance of the generated creative asset with each of the one or more supply source rules is performed by supply source.

In some embodiments, the computer-implemented method further comprises generating a preview of the creative asset in a supply source environment, wherein the supply source environment comprises a visual representation of one of the one or more advertisement impression opportunities of the online location. In some embodiments of the computer-implemented method, the supply source environment comprises a representation of a selected hardware configuration.

In some embodiments, the computer-implemented method further comprises bidding, by the user through a real-time bidding platform, to place the creative asset on the advertisement impression opportunity, wherein the real-time bidding platform is in electronic communication with the creative asset management system. In some embodiments, the computer-implemented method further comprises transmitting the creative asset to the supply source in response to the bidding on the one or more advertisement impression opportunities. In some embodiments of the computer-implemented method, the bidder internally loads the one or more creative asset components and matches at least one creative asset component to a bid request, the match based at least in part on the supply source rules.

In some embodiments, the computer-implemented method further comprises automatically modifying, by the creative asset management system, at least one of the one or more creative asset components to comply with the one or more supply source rules. In some embodiments of the computer-implemented method, the modifying comprises altering the size, bitrate, or quality of the at least creative asset components.

In some embodiments of the computer-implemented method, the attaining the one or more supply source rules comprises normalizing supply source rule data into a unified data structure. In some embodiments of the computer-implemented method, the attaining the one or more supply source rules comprise crawling the supply source. In some embodiments of the computer-implemented method, the attaining the one or more supply source rules comprises utilizing an application programming interface (API).

In some embodiments of the computer-implemented method, the attaining the one or more supply source rules is completed periodically, continuously, dynamically, in real-time, and/or in substantially real-time. In some embodiments of the computer-implemented method, the supply source comprises one or more of Snapchat, Instagram, Facebook, CNN, the Wall Street Journal, the New York Times, the Economist, or Twitter. In some embodiments of the computer-implemented method, the analysis report comprises a projected response rate by consumers for the creative asset on the supply source.

In some embodiments, a computer-implemented method for preview, modification, and management of creative assets for diverse advertising platform environments comprises: receiving, by a creative asset management system from a user, one or more creative assets, wherein each of the one or more creative assets comprises one or more creative asset components; dynamically analyzing, by the creative asset management system, to identify the one or more creative asset components of each of the one or more creative assets and store the identified one or more creative asset components on a creative asset database in electronic communication with the creative asset management system; receiving, by the creative asset management system, user input to generate a new creative asset for placement on an advertisement impression opportunity; attaining, by the creative asset management system from a supply source of the advertisement impression opportunity, one or more supply source rules for the advertisement impression opportunity, wherein the supply source comprises an online location serving as a source of the advertisement impression opportunity, wherein each of the one or more supply source rules comprises a predetermined requirement for at least one component parameter of the one or more creative asset components; dynamically determining, by the creative asset management system, which of the identified and stored one or more creative asset components complies with the one or more supply source rules for the advertisement impression opportunity; dynamically generating, by the creative asset management system, the new creative asset for placement on the advertisement impression opportunity based at least in part by combining the one or more creative asset components determined to comply with the one or more supply source rules; and generating, by the creative asset management system, a preview of the dynamically generated new creative asset and displaying, on a dynamic user interface of the creative asset management system, the generated preview to the user, wherein the creative asset management system comprises a computer processor and an electronic storage medium.

In some embodiments, a dynamic user interface (UI) for managing, previewing, and modification of creative assets for diverse advertising platform environments comprises: a supply eligibility indicator configured to initiate analysis of an eligibility of a selected creative asset for display on one or more impression opportunities of a supply source website, wherein the eligibility of the selected creative asset is dynamically determined, by a creative asset management system, by comparing one or more components of the selected creative assets against one or more supply source rules of the supply source website, wherein the creative asset management system is in electronic communication with the dynamic UI; a component list comprising at least one of the one or more components of the selected creative asset; a preview display pane configured to display the selected creative asset in a supply source environment, wherein the supply source environment comprises a visual representation of one of the one or more impression opportunities of the supply source website on a selected hardware configuration; a hardware configuration selection mechanism configured to allow a user to select the selected hardware configuration; an impression opportunity list comprising the one or more impression opportunities of the supply source website; and a share link mechanism configured to initiate electronic transmission of a dynamically generated computer notification, the dynamically generated computer notification displayed through the dynamic UI to one or more users, wherein the dynamically generated computer notification is configured to activate a remote subscriber computer and to enable connection via a URL over a computer network connection to a data source comprising an image of the preview display pane. In some embodiments of the dynamic user interface, the at least one component comprises at least one of the following: Body, Destination URL, Page ID, Video, Image, Text, Game, or Interactive Element.

BRIEF DESCRIPTION OF THE DRAWINGS

These features, aspects, and advantages of the present systems, methods, and devices will become better understood with regard to the following description, appended claims, and accompanying drawings which illustrate exemplary features. However, it is to be understood that each of the features can be used in the embodiments in general, not merely in the context of the particular drawings, and the invention includes any combination of these features.

A better understanding of the methods and systems described herein will be appreciated upon reference to the following description in conjunction with the accompanying drawings, wherein.

DETAILED DESCRIPTION

Figure 1:
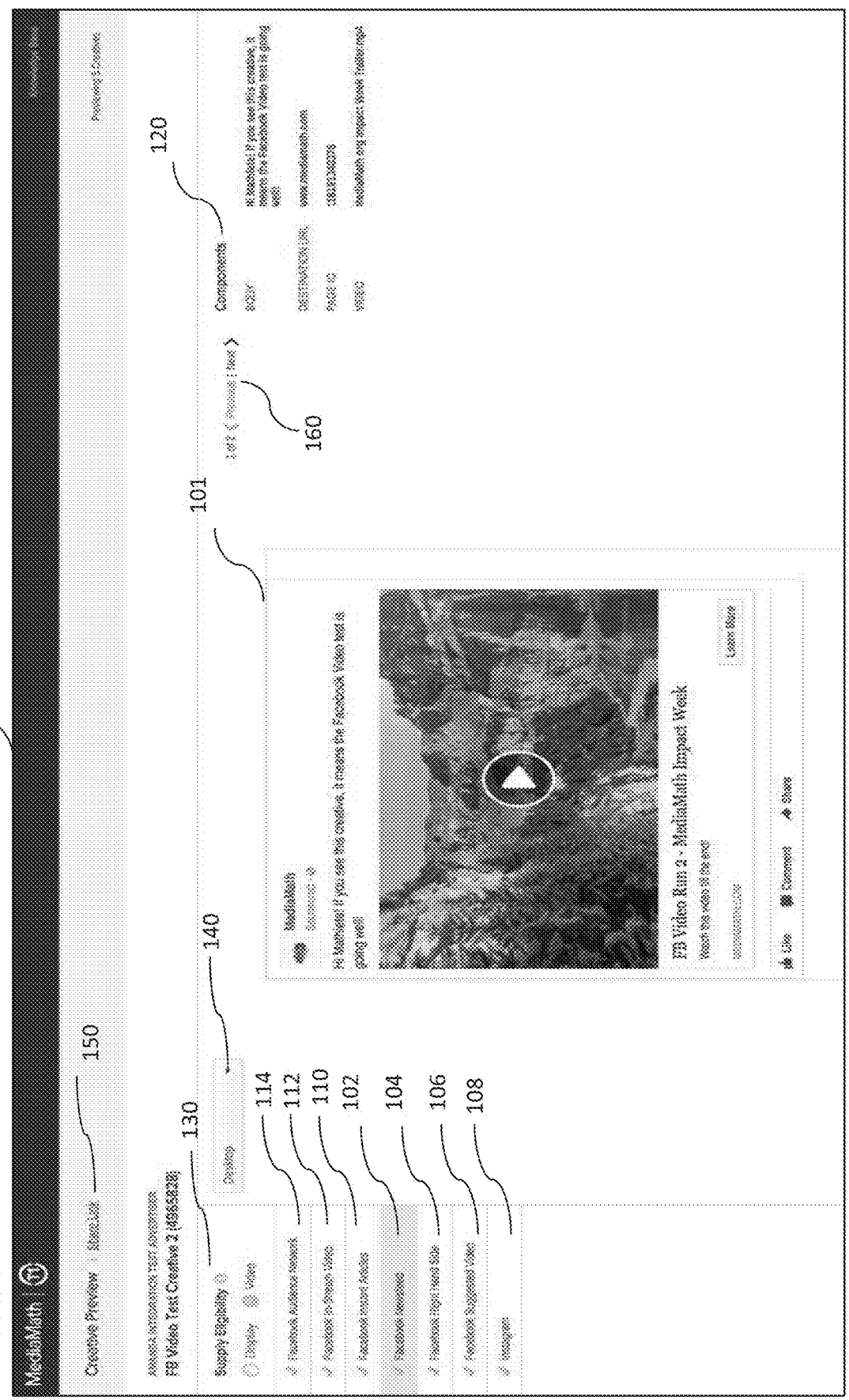
FIG. 1 illustrates an example embodiment of a user interface (UI) of a creative asset management system.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout.

The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

The systems, devices, and methods summarized and set forth in further detail below may describe certain actions taken by a practitioner; however, it should be understood that these steps can also include the instruction of those actions by another party.

Online advertising, online marketing, Internet advertising, and/or web advertising are commonly used forms of marketing and advertising which use the Internet to deliver promotional marketing messages to consumers. There are many different forms of online advertising, including, for example, email marketing, search engine marketing (SEM), social media marketing, many types of display advertising (including web banner advertising), and/or mobile advertising. Online advertising generally involves a publisher or opportunity provider, who integrates advertisements into its online content (e.g. Facebook, CNN, Twitter), and an advertiser, who provides the creatives advertisements to be displayed on the opportunity provider's content. Other potential participants include advertising agencies who help generate and place the ad or creative asset, and/or ad server which technologically delivers the creative and may track statistics.

There are many benefits of online advertising compared to traditional advertisement methods. The low costs of electronic communication reduce the cost of displaying online advertisements compared to offline ads. Additionally, online advertising, and in particular social media, provides a low-cost means for advertisers to engage with many large and established communities and platforms.

Also, online advertisers have a wide variety of ways of presenting their promotional messages, including the ability to convey images, video, audio, and links. Unlike many offline ads, online ads may also be interactive. For example, some ads let users input queries, let users follow the advertiser on social media, or even play games.

However, the flexibility, multitude of advertising platforms, and high speed of deployment of online advertisements causes additional problems that have not yet been adequately addressed. Integration of multi-formatted creative assets with the huge amount of internet ad impression opportunity platforms is not seamless. Each platform has its own rules and technical limitations, which may need to be satisfied in order for an advertisement to be displayed properly and to be given permission to be displayed on the platform. Previously, advertisement creators needed to create many different forms of the same advertisement, such that the advertisement could be displayed on different platforms and/or within impression opportunities with different requirements on the same platform.

Generally speaking, certain online advertisement and/or digital advertising systems can allow a user or advertiser to upload a creative asset for placement as an advertisement, in which the creative asset can comprise a graphical image, text, video, audio, and/or the like. Such online advertisement systems can further allow the user or advertiser to place one or more bids for publishing the creative asset or advertisement based on the creative asset on a particular online advertisement opportunity. For example, the system can be configured to allow bidding of advertisement space on news sources such as CNN or social media such as Facebook.

However, advertisement systems typically do not allow advertisers to consolidate their advertising efforts into one central platform and do not inform the creation of creatives. For example, advertisers may wish to advertise on multiple platforms using variations of the same creative. The changes may be due to different supply source rules that the publishing and/or advertising platforms may have. In such case, advertisers may not be able to create the creatives with the supply source rules in mind. Furthermore, in such case, advertisers would generally have to manually change their creatives to fit into the rules set by the different publishing platforms and/or would not be able to preview their creatives as they would appear on the publishing platforms before the advertisers submit their bids.

Additionally, such advertising systems generally may not allow the advertisers to track their advertising efforts or provide analysis based on their selected preferred publishing platforms. Additionally, such advertisement systems generally may not provide omni-channel communication and switching, such as among virtual reality (VR), augmented reality (AR), two-dimensional display, three-dimensional display, audio, visual, and/or any other creative formats.

Thus, new systems, methods, and devices for componentization, modification, and management of creative assets for diverse advertising platform environments are needed.

The present application describes systems, methods and devices for creative asset management that address one or more such features, some of which can be utilized in closed/batch supply and/or open real-time bidding (RTB) supply opportunities. The present application further describes systems, methods and devices for creative asset management that may have bi-directional features. In particular, in some embodiments, the creative asset management systems, methods, and devices described herein can allow advertisers to consolidate their online advertising efforts into one central platform.

Advertisers may wish to advertise on multiple websites to reach the broadest number of potential consumers. Moreover, advertisers may want to track their efforts so that they can better understand which websites generate a higher click percentage. In some embodiments, advertisers can also tailor their advertisements across different platforms to best conform to that specific website's display requirements and/or to specifically target that website's known audience. In addition to advertising on closed/batch supply websites, advertisers can also engage in real-time bidding activities in certain embodiments.

In some embodiments, the creative asset management systems, methods, and devices as described herein can allow advertisers to store and manage all creative assets that can be used across a variety of different advertising platforms, thereby allowing an advertiser to consolidate advertising efforts. Specifically, in certain embodiments, a creative asset management system can be configured to manage and/or match an advertiser's creatives to supply source rules of an advertising platform.

The creative asset management system can also, in some embodiments, generate a preview of an advertisement created based on the asset(s) for the advertisers to see. Such a preview may be obtained from a supply source and can allow the advertisers to see how the creative would look as an advertisement on the specified publishing or advertising platform. For example, in some embodiments, the system can allow an advertiser or user to select one or more assets for generating an advertisement for a particular platform, after which the selected one or more assets can be transmitted to the platform, which can then generate the advertisement comprising the one or more assets and transmit a preview to the system for viewing by the advertiser. Additionally, in some embodiments, because different advertising or publishing platforms can have different supply source rules that could be updated periodically, the creative asset management systems, methods, and devices can be configured to keep track of the supply source rules by storing supply source rules from a variety of publishing or advertising platforms and periodically and/or simultaneously update the supply source rules, for example by crawling the supply source websites.

Certain embodiments of the creative asset management systems, devices, and methods can allow advertisers to place bids on advertisement opportunities as advertisement previews are generated by the system. Further, in some embodiments, the system can notify the advertiser if one or more components are missing for compliance with one or more supply source rules of the advertising platform. Additionally, in certain embodiments, the creative asset management system can be configured to modify the creative assets to meet specific supply source rules and also generate analyses and reports based on the identified publishing platform and audience.

Due to the advent of VR, AR, three-dimensional displays, and/or other creative formats, advertisers may be more and more in need of a central platform that can allow them to communicate with their consumers across all social media platforms, technological platforms and/or allow them to track real-time responses. To address such concerns, in some embodiments, creative asset management systems, devices, and methods herein can provide omni-channel communication and switching.

In some embodiments, the creative asset management system may comprise a user interface (UI) that advertisers can use, for example, to upload and/or manage creative assets. In certain embodiments, the UI can be accessed on desktop and laptop computers, mobile devices, and/or other electronic devices as well. In some embodiments, the UI can be accessed from a web-browser or as an application on the mobile phone or a program on the computer. The UI can allow advertisers to upload their creative assets and also allow the advertisers to preview the assets as they would appear on the publishing platforms, such as those that the advertisers has identified to be of interest.

The creatives that advertisers can upload may include, for example, images, texts, videos, QR codes, audio, and other types of advertising materials. The publishing platforms that the advertisers can choose from may include, for example, Snapchat, Instagram, Facebook, CNN, Wall Street Journal, New York Times, Economist, Twitter, and/or many other publishing and advertising platforms.

The UI may include several additional features, including, for example, filtering by Advertiser DDL, basic and/or advanced search functions, infinite scrolling, creative asset approval and rejection reporting, supply source approval with icons indicating status for supply source, asset component indicators, among others.

Supply eligibility of a creative asset can be determined by comparing one or more aspects/components of the creative asset against one or more supply source rules or rules set forth by advertisement opportunity publishers. For example, Facebook, CNN, or any other advertisement publisher can have particular requirement rules for a particular advertisement opportunity; a certain banner ad opportunity on a particular website can require placement of only video and/or image advertisement and/or require a particular bitrate and/or quality. Supply eligibility can be determined by whether a match between the creative asset and the supply source rules occurs. When a match occurs, some embodiments can be configured to allow the advertiser to preview on the UI the creative asset as it would appear on the publishing platform whose supply source rules had been determined to match that creative. On the other hand, the system can be configured to return a message telling the advertiser if a match between the advertiser's creative and the publishing platform is not possible. This way, the advertiser can decide whether to change the creative to fit the publishing platform's rules.

In some embodiments, supply source rules can differ across the different supply sources. For example, Facebook and Instagram can require that at least Page Id, Image & Destination URL be present or the submission will be rejected, while native advertising can require at least a Brand Name, Title, and Destination URL. In some embodiments, other rules such as character limits can be enforced (also differing between supply sources), including component specific requirements. In some embodiments, the creative asset management system may comprise one or more varying adapted functionalities for obtaining and updating supply source rules from different publishers. More detail and requirements can be found in Appendix A.

For native advertisements which can be a type of display advertising, image, title, and description can be required by supply sources. There may also be character limit rules that apply to title and description. There are sometimes restrictions or limits on JS tags, as well as limits of total number of 3P trackers. Secure links can also be required. Minimum image and logo sizes may also be requirements. Other supply source rules may also be present.

In some embodiments, uploaded creative assets are manually and/or automatically componentized, such that various constituent parts of the creative assets are identified or determined. In some embodiments, this componentization may allow editing and modification of the individual components of the creative assets. In some embodiments, components are reusable across media types. In some embodiments, a component is just a part and/or a feature of a creative. Utilizing components may enable the creation of different types of creative assets across different supply sources but all using/sharing the same component as needed for each creative type and/or supply source. In some embodiments, this removes the need to recreate an asset multiple times simply to satisfy the different requirements of each supply source. For example, utilizing components may enable the entering/uploading/automatic determining of the different parts (e.g. ad title, click URL, image, video, etc.) of the creative once. The components can then be made individually available for each of the available supply sources to build different creative sizes and formats that meet their specified technical requirements and/or supply source rules. In some embodiments, the system may utilize machine learning and/or artificial intelligence to understand how to break creative assets apart automatically at the component level.

In some embodiments, instead of a user having to create the same creative over and over again themselves manually for each supply source depending on their requirements, the system may enable uploading of individual creative components (e.g. a body component, title component, click through component and image component, etc.). In some embodiments, depending on the requirements of each supply source, the system may enable the user to choose whichever components they need to build the creative as a whole through the UI. In some embodiments, the creative asset management system may allow the creation of a creative that follows the same look and feel throughout of another previously built creative but meets the requirements of all the different supply sources without forcing the user to manually build a new creative for each supply source.

In some embodiments, the creative asset management system may comprise functionality for assembling components of a creative asset into a single, unique creative asset. In some embodiments, the system may automatically determine and set image and video component types. In some embodiments, when a user uploads a video, image, or other media as part of a creative, the system may automatically set the type of component to match the type of asset.

Additionally, in some embodiments, the system, or UI thereof, can allow the publisher to preview how one or multiple assets would look across different publishing platforms. The UI can also be configured to display a component list of each creative and allow the advertiser to change each creative designated for each publishing platform. For example, the advertiser can change the catchphrase for a creative that would show up on CNN relative to the creative that would show up on Instagram even though both creatives use the same underlying image. In some embodiments, the system can also allow the advertiser to change each creative based on different target groups within the same publishing platform. For example, the advertiser can display a creative in full color to Facebook users identifying as being in the age group 25-30 and display that same creative as a monotone image to Facebook users identifying as being in the age group 31-35. The UI can also display how a preview would look to a user viewing from a mobile device, VR, AR, or another platform. For example, the advertiser accessing the UI from a desktop computer can be allowed to view how the creative may appear to an audience viewing the creative asset by accessing Facebook from a mobile device.

In some embodiments, after the components are submitted (e.g. uploaded, retrieved from a database, etc.) the system and/or supply source may retrieve the pieces and place them into the different templates that are available (e.g. desktop, mobile, VR etc.). In some embodiments, the Social and Closed Supply (SCS) system, an API that acts as an intermediary between the Supply Source and Component Creatives (CC) system, may return each of the previews from the Supply Source's response that the CC API retrieves from, for example, the CC Preview Service may use the aforementioned previews and display them within an iframe of the CC Preview Service, which may allow switching between each preview type via a DDL. In some cases (e.g. Instagram), the SCS may include an extra step before relaying the response to enable the CC UI and/or CC Preview Service to provide, for example, generic messaging by setting a flag of rejected or approved for the system and/or user to act upon. For example, the rejection may be returned within the preview itself. More detailed examples of responses can be found in the attached Appendix A.

In some embodiments, the creative asset management system described herein may preview and/or modify creative assets in various different operating system, web browser, and computer hardware (including mobile devices and different screen sizes) environments. In some embodiments, online advertisements, even on the same web page, may appear differently to users based on the operating system, we browser, and/or hardware on which it is displayed. In some embodiments, advertisements may not display properly or even appear at all depending on the environment in which it is displayed. In some embodiments, media-heavy creatives may create even greater compatibility problems, as some advertisements may use competing and exclusive software to render the ads (e.g. HTML 5 and Flash). In some embodiments, the creative asset management system may preview creative assets in various operating system, web browser, and/or computer hardware environments to allow a user to view how the asset will display in those environments. In some embodiments, the creative asset management system may be configured to automatically modify and/or allow a user to manually modify a creative to increase or facilitate compatibility in a specific end-user environment.

In some embodiments, the creative asset management system described herein may take into account ad blocking, ad filtering, and/or other advertisement altering software. Ad blocking software may block advertisements such that they do not appear to a user. For example, some browsers block unsolicited pop-up ads by default and other software programs or browser add-ons may also block the loading of ads, or block elements on a page with behaviors characteristic of ads (e.g. HTML auto play). In some embodiments, the creative asset management system may simulate a computer environment including ad blocking, ad filtering, or other ad alteration software such that a user can preview how a creative asset may look and/or sound to an end-user with such installed software. In some embodiments, the creative asset management system may automatically modify and/or allow manual modification to enhance display of advertisements and/or certain advertisement elements in systems with ad blocking software.

In some embodiments, the creative asset management system may comprise a single omni-channel platform including a real-time bidding platform, preview and modification platform, ad componentization platform, and/or other platforms. In some embodiments, the creative asset management system may provide marketers and ad creators with tools to execute smart marketing at scale and to power advertising experiences that are relevant and meaningful across every channel, format, and screen. In some embodiments, the creative asset management system may combine data, omni-channel media, and machine learning on one single programmatic platform. The system may provide a single workflow to minimize the time spent learning, navigating and operating on multiple platforms.

In some embodiments, the creative asset management system may comprise a demand side platform (DSP), which may allow marketers to manage omni-channel campaigns across, for example, mobile, display, social, video, audio and native, among others. In some embodiments, the creative asset management system may comprise a complete set of capabilities needed to manage coordinated omni-channel ad campaigns including execution, creative management, targeting, and reporting in a centralized location, allowing marketers to avoid inefficient siloed channel buying. In some embodiments, the creative asset management system may enable control and optimization of all of a user's ad media on a single platform. In some embodiments, all reporting, attribution and insights may be normalized across channels and be integrated on a single creative management platform as described herein. In some embodiments, for example, supply source rules from various publishers having varying data structures and formats must be translated into a unified format such that the creative asset management system may interpret the rules and compare the rules against creative components to determine compliance.

The systems, methods, and devices described herein involve a creative asset management platform that may comprise a dynamically generated user interface that enables graphical display of creative asset management tools, previews, modification windows, and/or bidding mechanisms, among others. The platform may be enabled to interface with a plurality of disparate databases, such as supply source databases, creative asset databases, and the like which store data having a plurality of incongruent data structures. The platform may be configured to interface with these data structures and conduct a normalization process to transform the data into a single, unified data structure. The normalized data can be presented to users through the dynamically generated user interface, which may be configured to automatically update its display based on newly acquired data and/or user interaction with the platform.

In some embodiments, data such as, for example, supply source data, creative asset approval data, and/or creative assets, can be acquired through utilization of one or more application programming interfaces (APIs) (e.g., Social and Closed Supply (SCS) API, Component Creative (CC) API, etc.). In some embodiments, utilization of one or more APIs may allow the systems described herein to interface with advertisement impression opportunity providers and/or publisher websites and other sources of supply source data, creative asset approval data, and/or creative asset data. In some embodiments, one or more APIs are used to exchange data between a supply source rule database, blockchain database, external databases, and/or publisher databases to transfer data from one database to another. Additional details regarding API utilization by the creative asset management system can be found in Appendix A.

In some embodiments, utilization of an API may increase efficiency by providing the creative asset management platform with the capability to interface with supply source and creative asset databases to quickly and efficiently update supply source rules and obtain creative asset approvals from third-parties. For example, for updating the supply source rules from Facebook and/or Instagram, a SCS API may include rules within a response from a main query from the CC API. For Native content, (ST, TPL) a Creatives Minions Service may complete the supply source integration and send all components/creative assets for approval and for the supply source to build and return a final creative. In some embodiments, creatives are approved or rejected once the supply source runs all components through their specific supply source rules. The use of these one or more APIs may greatly increase the efficiency and accuracy of the creative asset management system by directly interfacing with supply sources to ensure that the rules and requirements for creative assets on a given platform are constantly updated so that creative assets may be approved.

The creative asset management platform may also comprise systems for managing and modifying creative assets more efficiently through generation of interfaces for display of normalized data. These various interfaces may be distinctive to each user of a plurality of users, the distinctiveness generated based on, for example, user information or search data gathered by the platform. The various interfaces may form an aggregate dynamic user interface for managing creative assets for an integrated marketing campaign.

In some embodiments, the creative asset management system may increase efficiency in multi-channel and/or omni-channel marketing campaigns by enabling cross-channel decision making, holistic frequency management and intelligent ad sequencing. In some embodiments, the creative asset management system may enable management of all creative assets and provide the full buying potential of an omni-channel solution. In some embodiments, the creative asset management system may comprise a fully automated malware scanning and validations system to provide a safe environment. In some embodiments, creatives and assets are automatically scanned and validated by the system. In some embodiments, the creative asset management system may enable a universal approach to rapidly re-apply creative assets to activate new channels and media sources.

In some embodiments, the creative asset management system facilitates managing of creative assets across a diversity of channels and formats in the online advertising ecosystem, which requires specialized products and features. Without a complete and integrated system such as the creative asset management system, even basic advertising efforts can become burdensome. The creative asset management system may allow users to optimally apply and re-apply their creative assets to any format, while the system automatically ensures that the asset is delivered in the correct format, regardless of channel, device or media requirements.

In some embodiments, the creative asset management system may ensure that creative assets are universally applicable to facilitate true omni-channel marketing. The omni-channel creative asset management system may facilitate rapid adoption of new channels using existing creative assets, so customers can be reached anywhere products or services can be viewed online. In some embodiments, the efficiency benefits of using the omni-channel creative asset management system increases as the number of channels proliferate.

In some embodiments, the creative asset management system comprises a user-friendly user interface that allows for editing and management of creative assets without requiring or heavily reducing the need for software coding. In some embodiments, the creative asset management system may enable smarter, data-driven creative editing and streamline the creative build process to maximize efficiencies. By integrating data, machine learning and automation in the creative process, the creative asset management system may enable marketers to efficiently deliver more resonant brand experiences in their digital advertising. In some embodiments, the creative asset management system may automatically generate and manage large libraries of creative assets.

As shown in FIG. 1, in some embodiments, a creative asset management system can be configured to determine whether a particular creative asset is eligible for placement on one or more particular advertisement opportunities. For example, in some embodiments, a UI of a system can comprise a supply eligibility feature configured to analyze and/or initiate analysis of the eligibility of a particular creative asset and display such results. As a non-limiting example, in the illustrated embodiment in FIG. 1, the system UI can show that a creative asset of interest, such as a video, can be eligible for placement as an advertisement on the Facebook Audience Network, Facebook In-Stream Video, Facebook Instance Articles, Facebook Newsfeed, Facebook Right Hand Side, Facebook Suggested Video, and/or Instagram. Specifically, as illustrated in FIG. 1, if the advertiser or user selects Facebook Newsfeed, the system can be configured to display a preview for the user's video creative as it would appear in Facebook Newsfeed. Additionally, in some embodiments, a component list can be displayed showing all the components of the creative or a subset thereof. Specifically, as illustrated in FIG. 1, components of the preview of the Facebook Newsfeed advertisement can comprise a body, a destination URL, a page ID, and an mp4 video.

In FIG. 1, an example embodiment of a user interface (UI) 100 of a creative asset management system is shown. For example, in some embodiments, a user interface (UI) and/or graphical user interface (GUI) 100 can comprise a display of a video advertisement as would be displayed as an advertisement on Facebook on a desktop web browser or another platform and/or device. Furthermore, as illustrated in FIG. 1, in some embodiments, one or more green check marks or other graphical display of compatibility can appear in the Supply Eligibility 130 box. In the illustrated embodiment, the Supply Eligibility 130 comprises green check marks showing eligibility of the ad for Facebook Newsfeed 102, Facebook Right Hand Side 104, Facebook Suggested Video 106, Instagram 108, Facebook Instant Articles 110, Facebook In-Stream Video 112, and Facebook Audience Network 114. In some embodiments, a green check mark and/or other indicator of compatibility can represent that a match has occurred between the creative asset and supply source rules for a particular ad impression opportunity. For example, in the illustrate example, a match has occurred between the creative asset, a video advertisement, and the supply source rules for Facebook Newsfeed.

In some embodiments, the user interface can comprise a listing of components of the creative. For example, on the desktop screen in the illustrated embodiment, a components list 120, including Body, Destination URL, Page ID, and Video, is displayed. In some embodiments, the user interface can comprise a drop-down box for selection of a viewing device, such as Desktop 140. Other options, such as interstitial, mobile and omni-channel options can also appear. In some embodiments, a preview screen of the creative can be shared with other users, for example by clicking on a "share link" button 150. When multiple assets are inputted, the user interface can comprise page turn buttons 160 to allow a user to toggle between the multiple assets. In addition to advertisement impression eligibility, other previews and/or displays can be displayed on certain embodiments. For example, analyses of a target audience based on selected publishing platforms may be displayed to the advertiser on the UI. In certain embodiments, the UI not only allows the advertiser to preview the creative as it would be displayed across different publishing platforms and analyses and reports generated by the creative asset management system, but also allows the advertisers to engage with the audience as a whole and each individual consumer. For example, an advertiser may interact with consumers by responding to consumer posts, such as responding to a Facebook Newsfeed Ad commentary.

Figure 2:
FIG. 2 illustrates an example embodiment of a UI of a creative asset management system.

As shown in FIG. 2, in some embodiments, the system, or UI thereof, can be configured to display a preview of how an advertisement generated based on a creative can appear to a particular audience, for example an audience viewing the advertisement using a mobile device. As a non-limiting example, in the illustrated embodiment in FIG. 2, the system UI can be configured to display that a creative asset of interest can be eligible for placement as an advertisement on Facebook Newsfeed, Facebook Right Hand Side, Facebook Instant Articles, Facebook Audience Network, Facebook In-Stream Video, Facebook Suggested Video, and/or Instagram as the advertisement would appear to an audience accessing the advertisement through a mobile device. Specifically, as illustrated in FIG. 2, if the advertiser or user selects Facebook Audience Network, the system can be configured to display a preview for the video creative as it would appear in Facebook Audience Network when an audience accesses it through a mobile device. Specifically, in this Facebook Audience Network advertisement, the components list can comprise a creative name, page ID, destination URL, image, body, title and call to action.

As such, in FIG. 2, an embodiment of a UI 200 displaying a video advertisement for furniture 201 as would be displayed as an advertisement on Facebook through a mobile device is shown. In the illustrated example, the mobile advertisement 201 can be placed on Facebook Audience Network 202, Facebook In-Stream Video 204, Facebook Suggested Video 206, Instagram 208, Facebook Instant Articles 210, Facebook Right Hand side 212, or Facebook Newsfeed 214. As such, green check marks appear next to these preview options. However, in the illustrated example, a red x-mark appears next to the preview option for Native 216, showing that the video file is not compatible with Native. In some embodiments, the UI can further comprise a components list 220, including creative name, Page ID, Destination URL, Image, Body, Title, and/or Call to Action.

Figure 3:
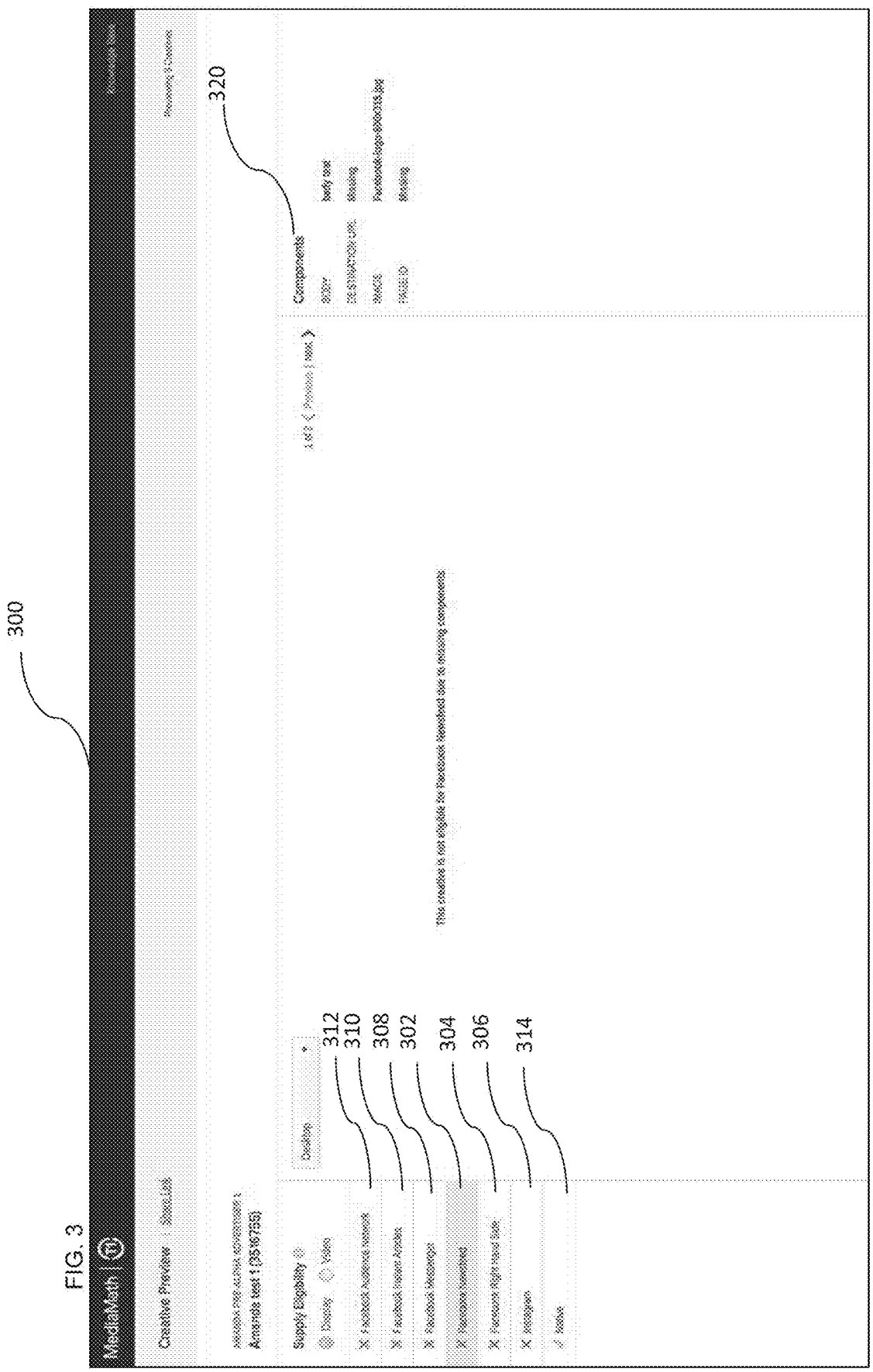
FIG. 3 illustrates an example embodiment of a UI of a creative asset management system.

As shown in FIG. 3, in some embodiments, the system, or UI thereof, can be configured to display that a particular creative asset is not eligible for placement as an ad on one or more platforms and/or that a preview of an advertisement generated based on a particular creative asset is not available, for example due to one or more missing components. For example, in the embodiment illustrated in FIG. 3, although body and image are present, the destination and page ID are missing as shown in the component list. As a result of such missing components, the system can determine that a match cannot be made between the creative asset and Facebook Newsfeed, for example based at least in part on comparison to one or more supply source rules. In the illustrated embodiment, the system can also display that a match for the creative asset also did not occur for Facebook Audience Network, Facebook Instant Articles, Facebook Messenger, Facebook Right Hand Side, and/or Instagram.

Figure 4A:
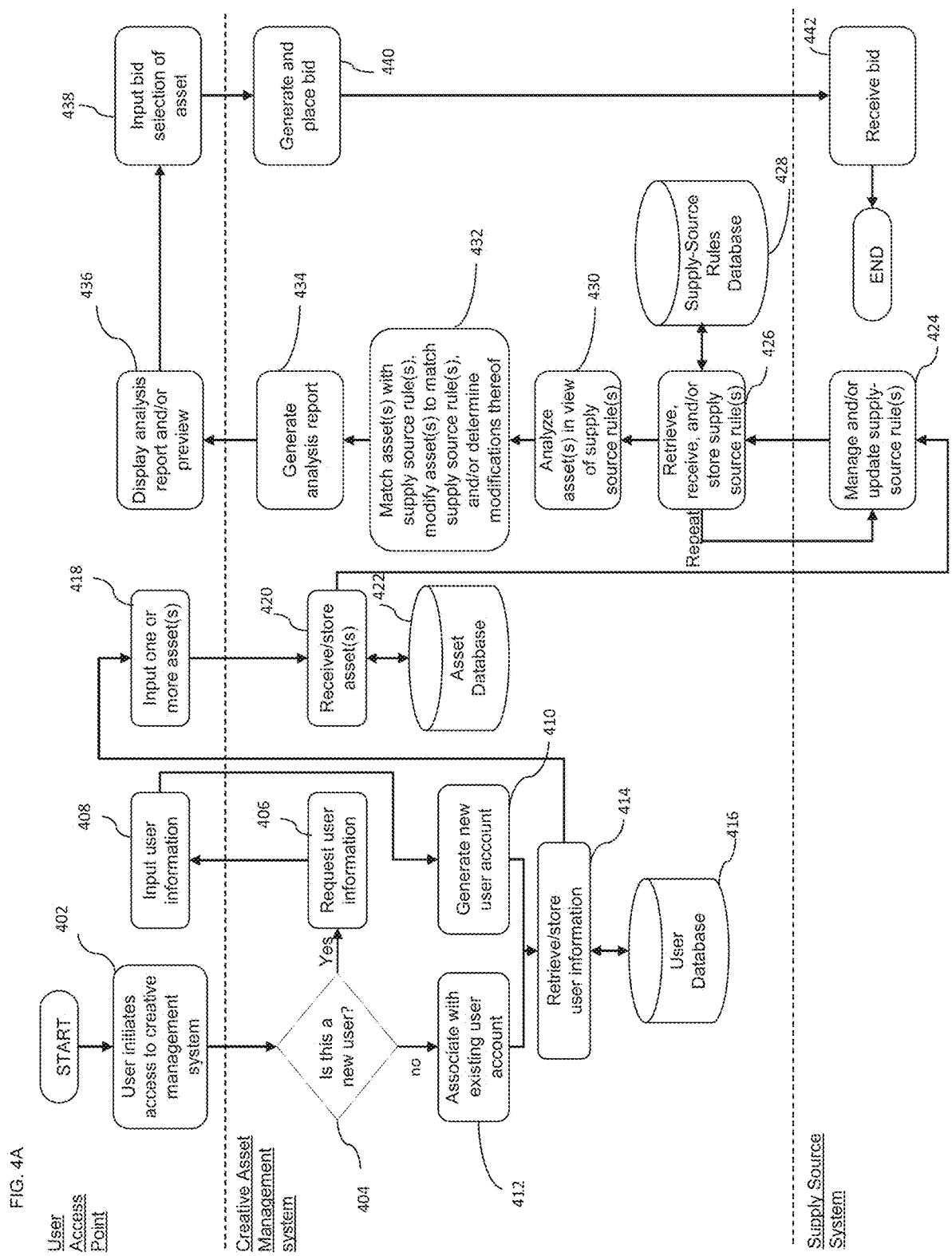
FIG. 4A is a block diagram illustrating an example embodiment of a method for managing creative assets using a creative asset management system.

FIG. 4A is a block diagram illustrating one or more embodiments of methods for managing creative assets using a creative asset management system. As illustrated in the FIG. 4A, in some embodiments, the method can comprise one or more processes and/or communications between a user access point, a creative asset management system, and/or a supply source system. In some embodiments, the user can initiate access to the creative asset management system at block 402. In some embodiments, the user can be an advertiser looking to place an ad. In certain embodiments, the creative asset management system can identify whether the user is a new user at block 404. In some embodiments, when the user is identified as a new user, the creative asset management system can be configured to request new user information at block 406. For example, new user information may include business name, address, telephone, website, Facebook profile, Instagram profile, Twitter profile, Snapchat profile, and/or other information.

In some embodiments, the user can then be prompted to input user information at block 408, and the creative asset management system can be configured to generate a new user account at block 410 based on such user information. In some embodiments, the new user information may include the number of accounts that the advertiser may wish to create as well as the level of access of each account. For example, a retail store owner may wish to create three accounts. For example, one account can be for the owner, who can have access to all the features of the UI. Another account can be for a social media manager, who can have access permission to upload and/or modify creatives such as images, videos and QR codes, but may not have permission to place a bid for an advertisement. A third account can be for an accounting manager, who can have access to place a bid for an advertisement but may not have access to upload and/or modify the creatives.

In certain embodiments, if the user does not identify as a new user, the creative asset management system can be configured to associate the user with an existing user account at block 412. After the user identifies as an existing user and the creative asset management system associates the user with an existing user account, the system can allow the user to update his or her information. For example, a retail store owner may by update its user information by inputting a new Snapchat account and/or further delegate access to new employees.

In some embodiments, after the creative asset management system generates a new user account at block 410 or associates a user with an existing user account at block 412, the creative asset management system can be configured to retrieve and/or store user information at block 414 into a user database 416. For example, a retail store owner's updated information, such as its new Snapchat account and/or new employee account information, can be stored in the store's database in the creative asset management system.

In some embodiments, after the creative asset management system retrieves and/or stores user information at block 414, the system can be configured to allow a user to input one or more creative asset(s) at block 418. Receiving uploads from the advertisers can be part of the bi-directional features of the creative asset management system. Subsequently, in certain embodiments, the creative asset management system can be configured to receive and/or store each piece of creative asset at block 420, which creative asset management can be stored in a creative asset database 422. For example, a furniture store owner, with access to all features of the UI, can upload an image of a convertible sofa. Simultaneously or shortly thereafter, for example, the image of the convertible sofa can be saved in the asset database 422 in the creative asset management system and can be associated with the furniture store owner's account. The furniture store owner can choose to view the image as is on the UI, or the furniture store owner may modify the image. For example, the furniture store owner may change the image of the convertible sofa from an all-colors image to a monotone image. Further, for example, the furniture store owner may change the pixilation of the image. Also, the furniture store owner may form a new image that consists of two smaller images the convertible sofa side-by-side and may give a title to that new image.

Figure 4B:
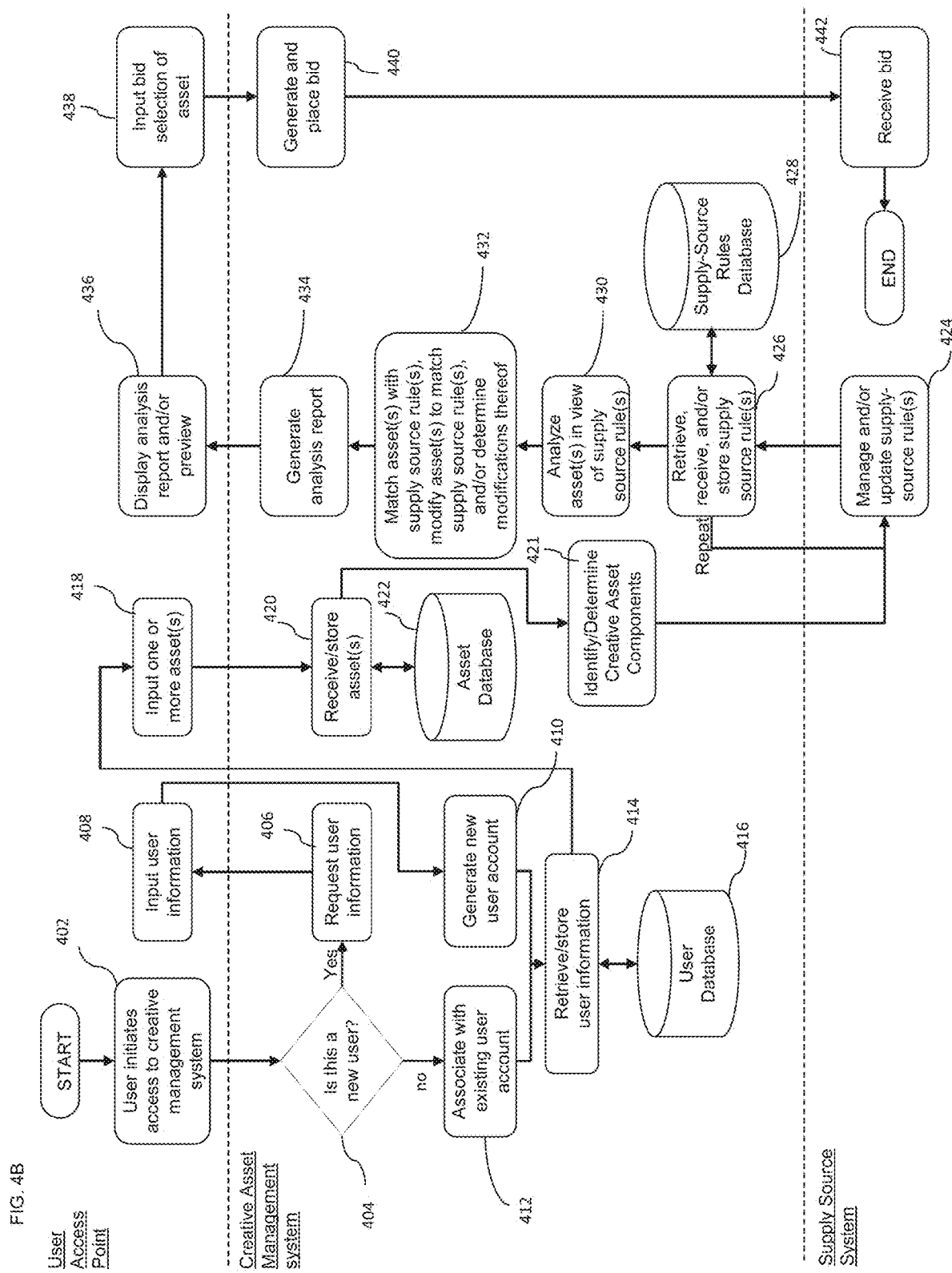
FIG. 4B is a block diagram illustrating another example embodiment of a method for managing creative assets using a creative asset management system.

In some embodiments, as shown in FIG. 4B, at block 421, the creative asset management system may identify and/or determine one or more components of the received creative assets. For example, if an advertiser uploads an entire ad comprising text, images, and links, the system may automatically identify each of the parts as a component, which can then be individually assessed for supply source rule compliance, modified, and utilized in various versions of the final advertisement on different platforms and/or impression opportunities.

At block 424, supply-source systems, such as news sources including the New York Times and CNN, social media plat forms including Facebook and Snapchat, search engines including Google and Bing, and other publishing platforms can update and/or manage their own supply source rules periodically, continuously, and/or in real-time. Independently and/or in conjunction with users inputting and/or managing their creative assets, in some embodiments, the creative asset management system can retrieve, receive, manage, store and/or update supply source rules at block 426 in supply-source rules database 428 for advertising and/or publishing opportunities. Receiving supply-source rules can be part of the bi-directional features of the creative asset management system. For example, Facebook may require a certain image size measured in pixels and/or a certain image ratio, and this requirement may be updated periodically. In such case, the creative asset management system, for example, can be configured to store the requirements Facebook has set on image size measured in pixels and/or image ratio and update this requirement periodically. The supply source rules may also be updated, for example, during the approval process. For example, if a creative is sent to a supply source for approval and is unexpectedly rejected in view of the supply source rules stored in the system, the system may update the rules to reflect any new rules that led to the unexpected rejection. The supply source rules may also be updated using mapping service.

In some embodiments, the creative asset management system can be configured to update supply source rules of one or more advertising and/or publishing opportunities periodically, continuously, dynamically, in real-time, and/or in substantially real-time. Optionally, in certain embodiments, the creative asset management system can be configured to crawl one or more advertising and/or publishing websites in order to obtain updated supply source rules of one or more advertising and/or publishing opportunities periodically, continuously, dynamically, in real-time, and/or in substantially real-time. For example, the creative asset management system can be configured to pre-specify a list of supply sources that the creative asset management system would retrieve the supply source rules from. For example, the creative asset management system may specify that it would retrieve supply source rules from a number of large news sources such as the Wall Street Journal, the New York Times, the Economist, the Washington Post, CNN, as well as a number of large social media platforms such as Facebook, Twitter, Snapchat, and Instagram, and a number of well-known video websites such as YouTube, Vimeo, and 9GAG. In some embodiments, the creative asset management system may pre-specify that it would retrieve supply source rules from certain search engines such as Google, Yahoo, and Bing. In certain embodiments, the creative asset management system can be configured to create a series of criteria for identifying potential supply sources. For example, the creative asset management system could have the criteria of "being searched for more than five times by advertisers" as criteria for including a supply source in its list of supply sources to retrieve supply source rules from. For example, in some embodiments, if more than five advertisers search for a particular website, the website can be included in the supply source database, and the creative asset management system can be triggered to retrieve supply source rules from this website.

In some embodiments, the process of retrieving, receiving, and/or storing the supply source rule(s) at block 426 in a supply source rules database 428 can be performed by crawling the supply sources for supply source rules through the use of API's or other crawler systems. In some embodiments, this step can be optionally repeated periodically, continuously, dynamically, in real-time, and/or in substantially real-time. For example, the creative asset management system may be configured to crawl Facebook for supply source rules updates every day, every other day, every week, every other week, or at another pre-specified interval. Alternatively, the creative asset management system may be configured to continuously crawl Facebook for supply source rules updates.

In some embodiments, the creative asset management system can analyze the asset(s) in view of supply source rule(s) at block 430. In some embodiments, the analysis can be directly displayed to the user through the UI. For example, the analysis can show the user the projected response rate by consumers for each piece of asset the user has inputted for each supply source. For example, the analysis may show the furniture owner how Snapchat users, further sub-divided by age group, responds to advertisements of furniture. In some embodiments, the creative asset management system can further match asset(s) with supply source rule(s), modify asset(s) to match supply source rule(s), and/or determine modifications thereof at block 432. For example, the creative asset management system can modify the image that the furniture store owner originally uploaded so that the modified image meets the rules of the supply source. For example, the creative asset management system can be configured to modify the pixilation of the image of the convertible sofa so that it meets the pixilation rules of Snapchat.

In some embodiments, the creative asset management system can generate an analysis report at block 434 after the creative asset management system tries to match asset(s) to the supply source rules. In some embodiments, the analysis report may show a successful match while in some embodiments, the analysis report may show a failed attempt to match. In some embodiments, the analysis report given by the creative asset management system can be configured to provide users feedback, suggestions, and/or projections based on the user's own data as well as data from other sources. For example, after a match, the creative asset management system can be configured to give the furniture store owner a report showing the details of each supply source that is a match for the image of the convertible sofa. For example, the report can include that both Snapchat and Facebook can display the convertible sofa advertisement. For example, the report can further include pricing information of the potential Snapchat advertisement and Facebook advertisement as well as the projected audience response rate of the potential Snapchat advertisement and Facebook advertisement.

In some embodiments, the creative asset management system dynamically picks a creative among many creatives supplied by the publisher that best fits each publishing platform's supply source rules. For example, if the furniture store owner has uploaded three images of the convertible sofa and has identified Snapchat as its preferred advertising platform, the creative asset management system may be configured to pick one image out of the three images that best fits the supply rules of the Snapchat publishing platform based on the supply-source rules the creative asset management system has identified. Furthermore, the creative asset management system may dynamically modify the images to better fit the supply-rules of the publishing platforms. For example, the publishing platform may dynamically modify the size, bitrate, quality, and/or any other attributes.

In some embodiments, the creative asset management system can be configured to also crawl for and/or update real-time bidding information. In some embodiments, the creative asset management system can be configured to store real-time bidding information in a real-time bidding database. In some embodiments, stored real-time bidding data can allow the users to receive real-time bidding information to help users make decisions whether to bid to place an advertisement. For example, the creative asset management system can be configured to display real-time bidding information for the convertible sofa to the furniture store owner. In some embodiments, when an advertiser is bidding on a bid opportunity, the creative asset management system may send the appropriate creative asset in response to that bid.

In some embodiments, the creative assets may comprise a serializer that prepares data for a bidder in the form of, for example, a text file data dump. In some embodiments, the bidder may comprise methods of handling this file, for example, via a Mailman Client and/or an external adaptor service. In some embodiments, the bidder may internally load the component creatives, then match the appropriate creatives to bid requests based on the requested creative attributes.

In some embodiments, the creative asset management system can be configured to cause a user access point system to display the analysis report and/or preview of the asset at block 436 to the user. In some embodiments, the user may be able to view the report displaying either a successful match or a failed attempt to match on the UI. For example, the user may be able to preview how the inputted asset would look on Facebook, Instagram, and/or other supply source systems. Further, the furniture store owner may be able to see the report showing the Snapchat advertisement and Facebook advertisement information showing the price and projected response rate. In some embodiments, if a successful match occurs, the user can be prompted to input a bid selection of an asset at block 438. Then, in some embodiments, the creative asset management system can generate and place the bid at block 440 with the supply source. In some embodiments, the supply source system can be configured to receive the bid at block 442. In some embodiments, the user's advertisement may subsequently become live, with the user's advertisement displayed the same way it showed up as preview to the user on the UI. For example, when the furniture store owner sees a suitable price, the furniture store owner may send a signal to the creative asset management system to purchase the advertisement for the convertible sofa in real time.

In some embodiments, if a match is not successful, the creative asset management system can be configured to generate an analysis report at block 434 and cause display to the user that a match between the asset and the supply source rules did not occur. In certain embodiments, the system can be further configured to cause display to the user which components are missing and/or how to fix the problem. In some embodiments, the user then can input the required components and/or fix the problem so that a successful match between the assets and the source rules occur.

In some embodiments, the creative asset management system can modify the assets the user has inputted, store the modified assets, and/or display the modified assets to the user through the UI. For example, the creative asset management system can append the assets together, compress the assets, and/or perform other modifications so that a match between different versions/formats of the assets can be generated. In some embodiments, all modified assets can be stored in the asset database.

In addition, in some embodiments, the creative asset management system can allow the user to access the UI from computer, mobile devices, and a variety of other channels. In some embodiments, the UI can allow multiple users to access the same account and allow different levels of access. In some embodiments, the creative asset management system can also allow for omni-channel advertisement and switching. For example, in some embodiments, a user can be allowed to preview the asset on a computer, and then switch to a VR platform, and then switch to another platform. In some embodiments, the UI system can allow users to view assets, preview the asset that has been matched to supply source rules, as well as engage and communicate with consumers through omni-channel communications.

Figure 7:
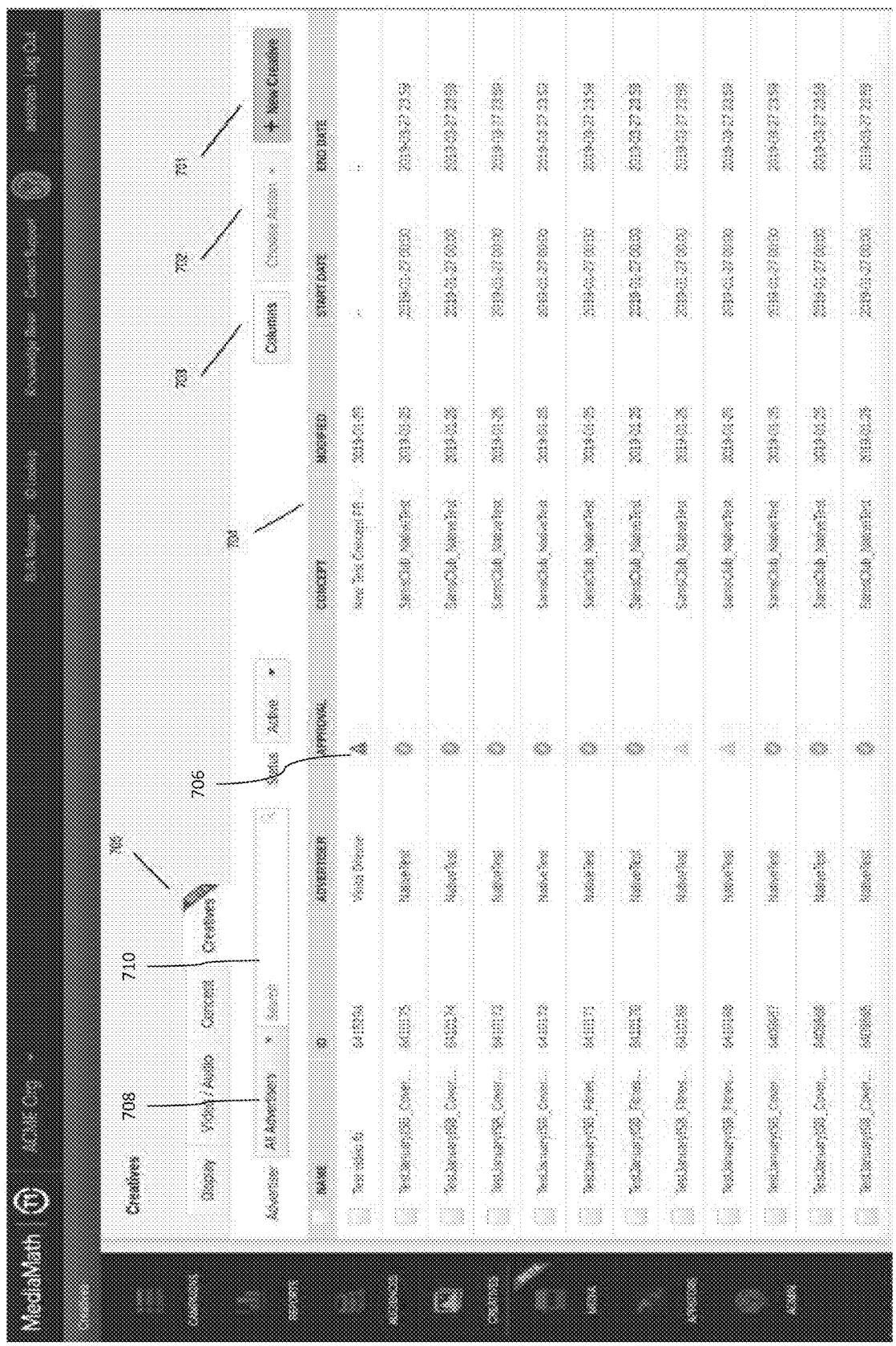
FIG. 7 illustrates an example embodiment of a UI of a creative asset management system.

FIG. 7 illustrates an example embodiment of a UI of a creative asset management system. In particular, FIG. 7 illustrates a workflow and master data management portal UI for managing creative assets and moving between various previews and approved creative assets within the system. The workflow portal UI may be used by, for example, an ad operations professional who completes the uploading of the creative assets to the system. The workflow portal may serve as the main UI where all of the component creatives that have been uploaded can be viewed and managed.

The workflow portal UI comprises a plurality of selectable columns and rows, wherein each row comprises information related to a single creative asset, the name of the creative asset being listed in the leftmost column. Each column contains a column heading 704, describing the information in each column. For example, the workflow portal UI of FIG. 7 comprises a NAME column for the creative asset name, an ID column for the system creative asset ID corresponding to the named creative asset, an ADVERTISER column for the advertiser of the creative asset, an Approval column for displaying an icon 706 which indicates whether the creative asset has been approved for the specific advertiser, a CONCEPT column for showing the preview environment concept for the creative, a MODIFIED column for displaying the time of last modification of the creative, a START DATE column for showing when the creative concept was created, and an END DATE column for showing when the creative was approved.

The approval icon 706 may be interactive such that when a user hovers over the icon, an exchange and a reason for rejection/provisional approval/limited approval/approval may be displayed by the system. The workflow portal may also comprise a filtering mechanism 708 and a search mechanism 710. For example, as shown in FIG. 7, the workflow portal can be filtered to show only creatives for a certain advertiser or brand and the creatives can be searched using a search bar.

The workflow UI may also comprise a New Creative button 701, which may initiate a process for uploading and/or previewing new creatives within the system. In some embodiments, the workflow UI may also comprise a Choose Action button 702, which may allow a user to select specific actions for a selected creative, such as publish the creative or delete the creative. In some embodiments, the workflow UI may comprise a Columns button 703, which may allow a user to create new columns, alter the displayed columns, or remove columns from the UI. The workflow UI may comprise one or more tabs 705, including, for example, a Creatives tab that may display the list of creatives of a user, as shown in FIG. 7. Other tabs may include tabs for specific creative types or components, such as images, audio, and/or video, concepts, and/or display types, among others.

Figure 8:
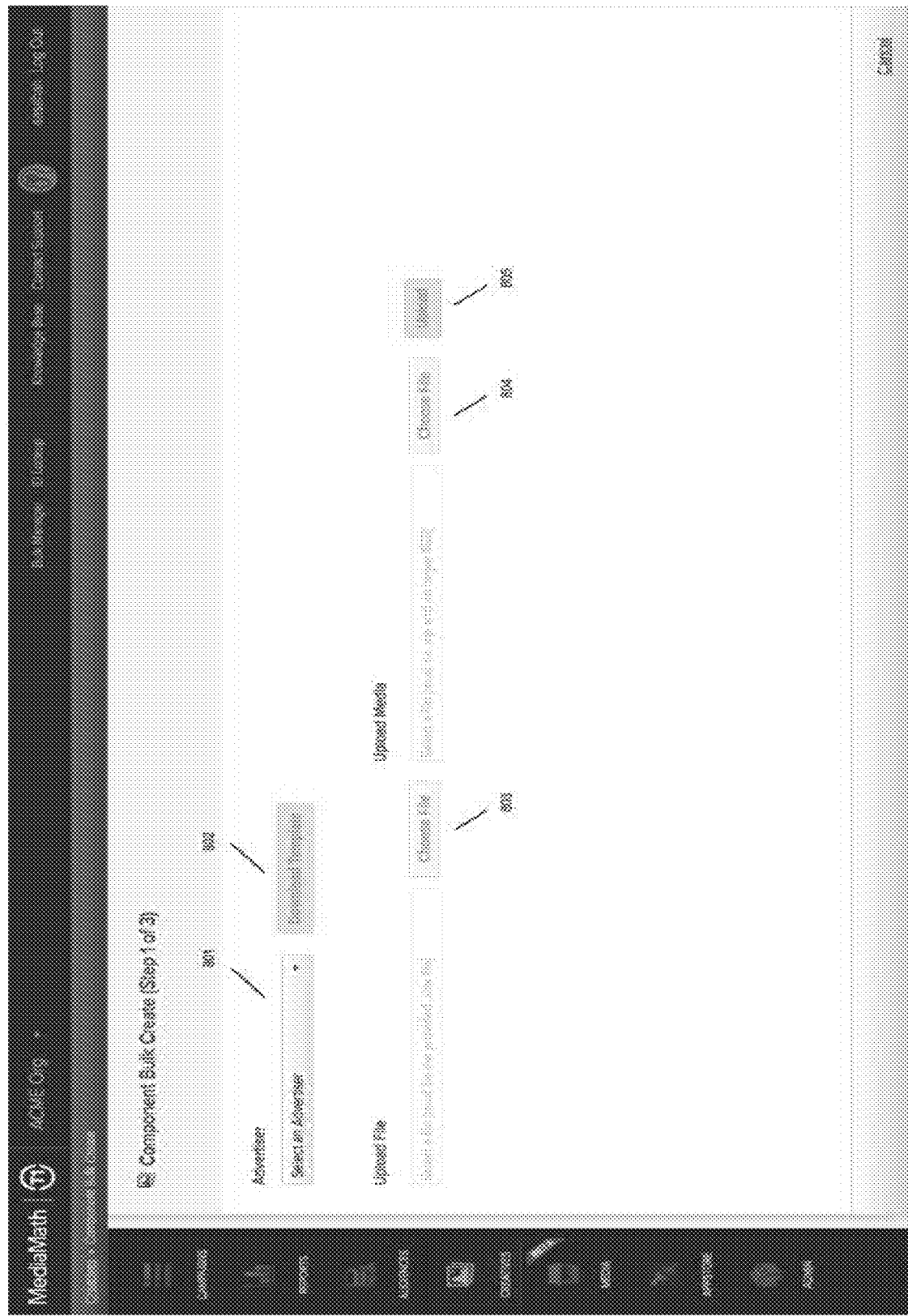
FIG. 8 illustrates an example embodiment of a UI of a creative asset management system.

FIG. 8 illustrates an example embodiment of a UI for uploading new creative assets and/or components to the creative asset management system. The uploading UI may comprise an advertiser selection mechanism 801, which may allow a user to select an advertiser or brand to associate with the creative asset or component. In some embodiments, the UI may also comprise a download mechanism 802, which may allow a user to download a template for the selected advertiser. The UI may also comprise a file upload mechanism 803 and a media upload mechanism 804, which allow a user to select a creative asset or component to the system. In some embodiments, the upload UI may comprise an upload confirmation 805 which may initiate the creative upload to the system upon selection.

Figure 9:
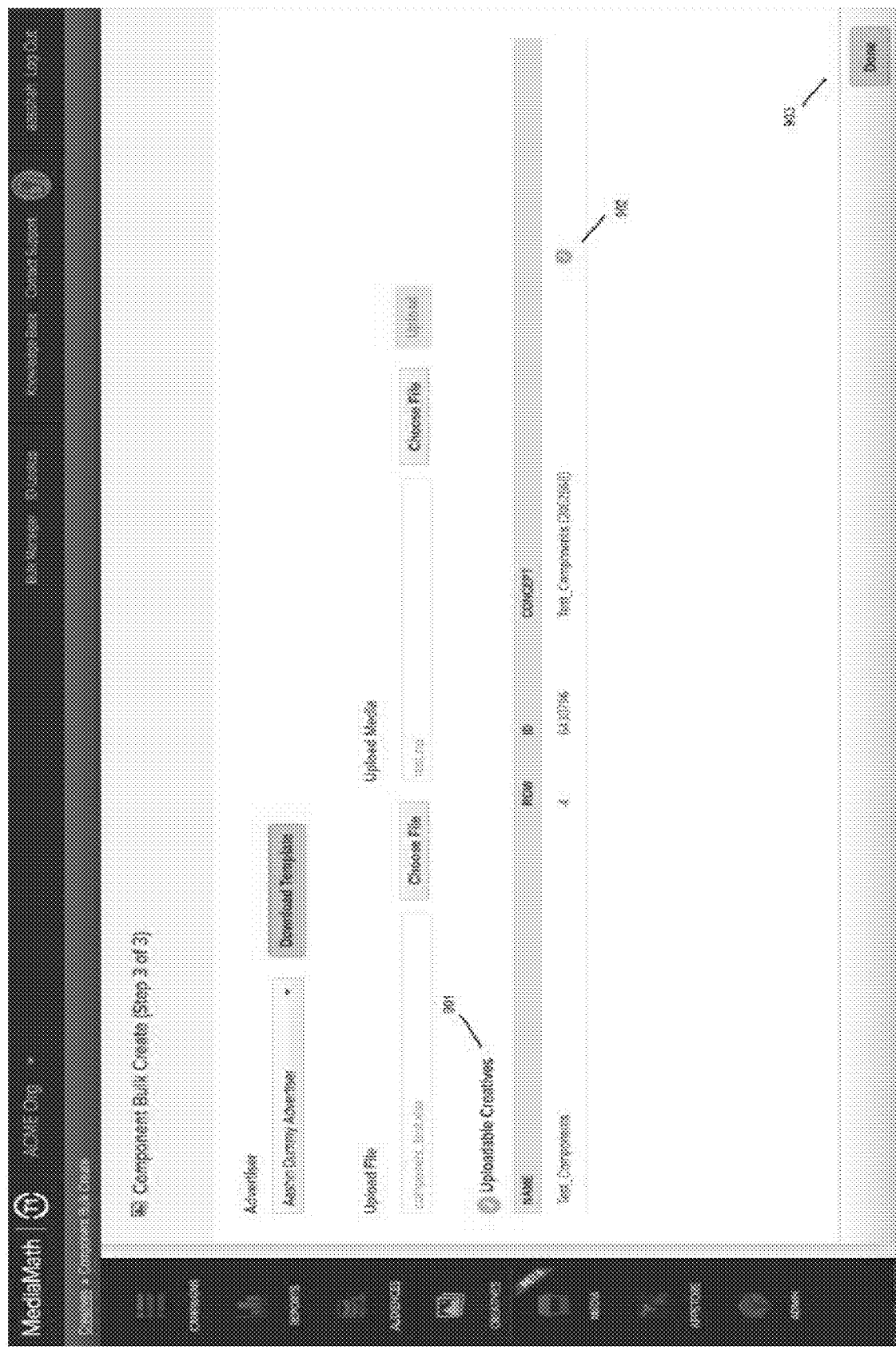
FIG. 9 illustrates an example embodiment of a UI of a creative asset management system.

FIG. 9 illustrates another example embodiment of a UI for uploading new creative assets and/or components to the creative asset management system. The UI of FIG. 9 may be displayed, for example, upon uploading of creative via the upload UI shown in FIG. 8. The upload confirmation UI of FIG. 9 may comprise an upload list 901 comprising a list of creatives which a user has attempted to upload to the system. The UI may also comprise an upload status indicator 902, which may indicate whether the uploading of each listed creative has been successful. In some embodiments, the upload confirmation UI may comprise a confirmation button 903, which may confirm the completed upload of the creative assets and/or components.

Computer Systems

Figure 5:
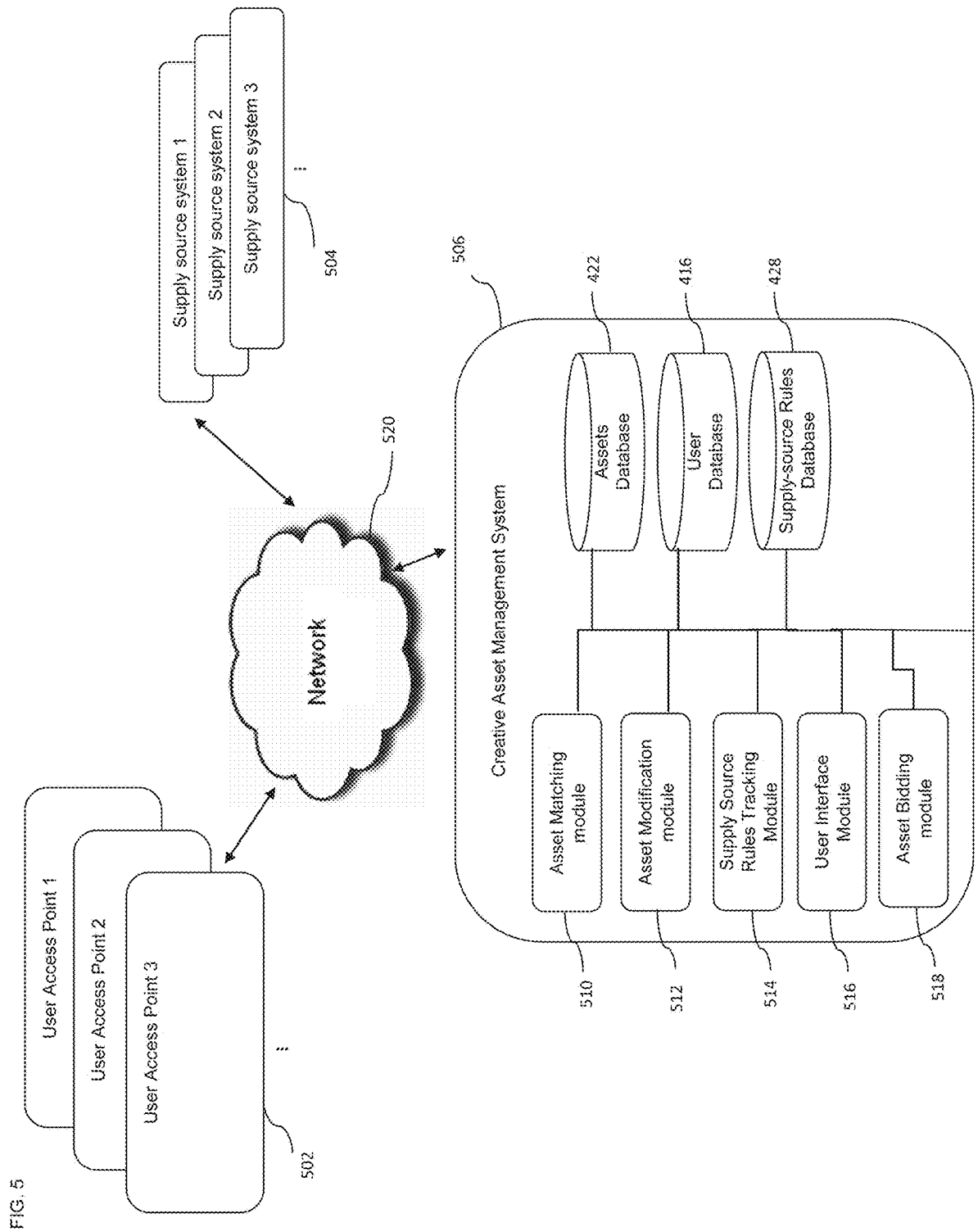
FIG. 5 is a block diagram illustrating an example embodiment a of creative asset management systems.

FIG. 5 is a block diagram illustrating an example embodiment of a computer system configured to run software for implementing one or more embodiments of the creative asset management systems, methods, and devices disclosed herein. In some embodiments, the various systems, methods, and devices described herein may also be implemented in decentralized systems such as, for example, blockchain applications. In some embodiments, as illustrated in FIG. 5, one or more user access point systems, supply source systems, and/or the creative asset management system can be interacting with each other over a network 520. In certain embodiments, a creative asset management system 506 can comprise an asset matching module 510, an asset modification module 512, a supply source rules tracking module 514, a user interface module 516, an asset bidding module 518, an assets database 422, a user database 416, and/or a supply-source rules database 428.

The one or more user access point systems 502 can comprise points of access for advertisers. In some embodiments, the one or more user access point systems 502 can comprise the UI. Specifically, in some embodiments, a user access point system can comprise a UI, through which the advertiser can upload its creatives, such as images, videos, QR codes and/or other advertising materials.

The one or more supply source systems 504 can represent one or more computing systems used by advertising and/or publishing platforms. For example, the advertising and/or publishing platforms may include Facebook, CNN, Instagram, Twitter, the Wall Street Journal, Snapchat and/or other news or social media network. In some embodiments, the creative asset management system 506 can be configured to connect, through a network 520, to one or more user access points 502 and/or supply source systems 504. The creative asset management system can be configured to query one or more supply source systems 504 through the network 520 and/or retrieve and store supply source rules. The creative asset management system can also be configured to communicate with one or more user access points 502 through the network 520.

For example, a furniture store owner can register for an account as an advertiser and upload images of a convertible sofa. The furniture store owner may identify a preference to advertise on Snapchat. In such case, the creative asset management system can be configured to store the store owner's information and preference as well as the uploaded images of the convertible sofa. The creative asset management system can then further be configured to match the store owner's image to the stored supply source rules of Snapchat. When a match occurs, for example, the match can be communicated from the creative asset management system back to the user access point system 502 through the network 520. For example, the furniture store owner can preview on the UI how the convertible sofa advertisement would look on Snapchat to the target audience if the advertisement had been placed. When the advertiser decides to bid to place the advertisement, this decision can be communicated from the user access point 502 to the creative asset management system 506, through the network 520 and the user's information can be updated. The furniture store owner's decision to bid for this Snapchat advertisement can be communicated to the creative asset management system and the furniture's profile can be updated to show that the furniture store has placed this Snapchat advertisement. Simultaneously or shortly after the user's decision to bid to place the advertisement, this decision can be communicated from the creative asset management system 506 to the supply source systems 504.

For example, the creative asset management system 506 can communicate the furniture store owner's bid to Snapchat. After the supply source system 504 accept the bid, a confirmation can be sent from the supply source system 504 back to the creative asset management system 506, through the network 520. The creative asset management system 506 can then update the user's information and/or relay the confirmation of bidding to the user access point 502 through the network 520.

Figure 6:
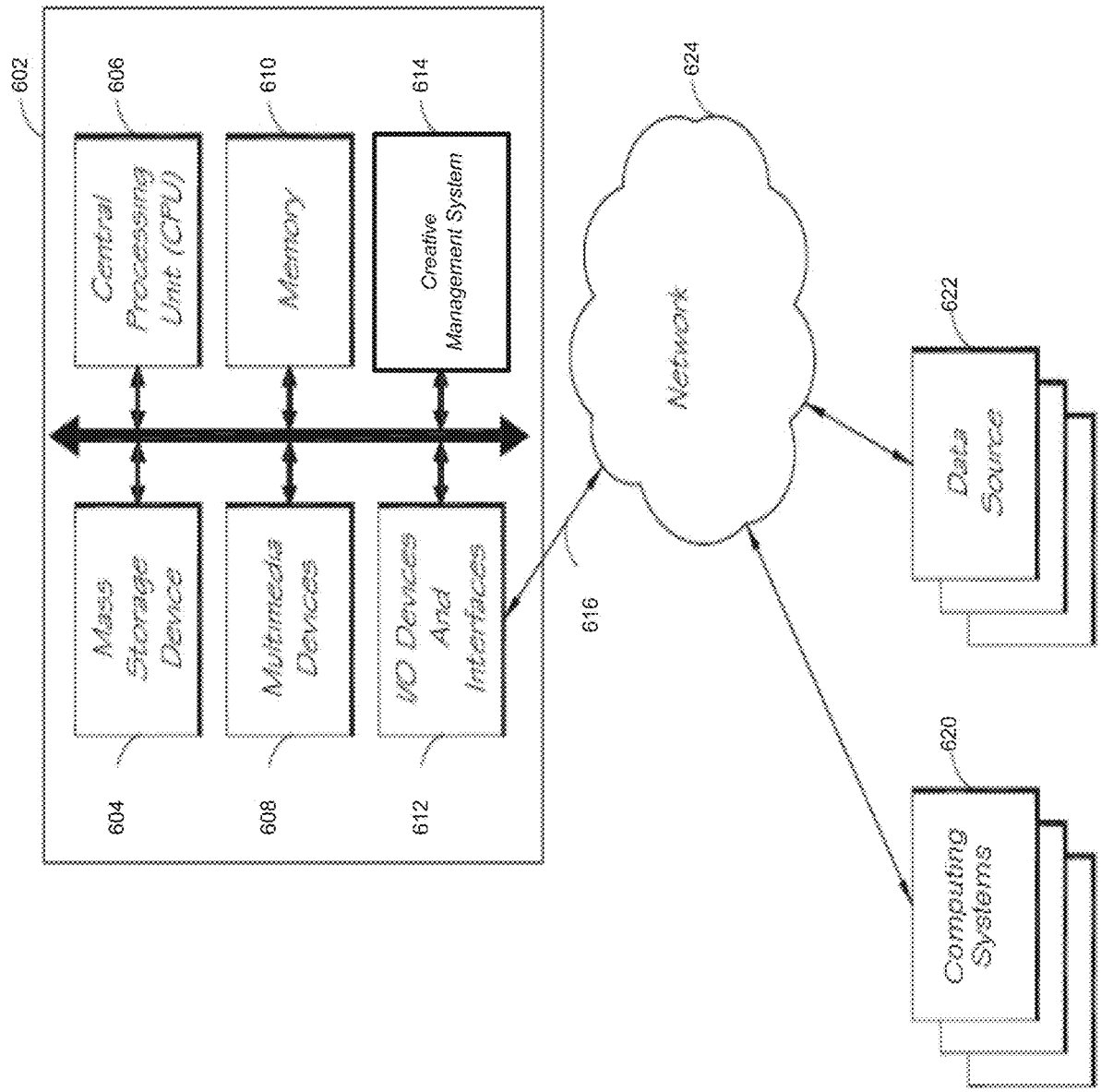
FIG. 6 is a block diagram illustrating a computer hardware system configured to run software for implementing one or more embodiments of creative asset management systems according to some embodiments described herein.

FIG. 6 is a block diagram depicting an embodiment of a computer hardware system configured to run software for implementing one or more embodiments of the creative asset management system, devices, and methods described herein.

In some embodiments, the systems, processes, and methods described herein are implemented using a computing system, such as the one illustrated in FIG. 6. The example computer system 602 is in communication with one or more computing systems 620 and/or one or more data sources 622 via one or more networks 618. While FIG. 6 illustrates an embodiment of a computing system 602, it is recognized that the functionality provided for in the components and modules of computer system 602 may be combined into fewer components and modules, or further separated into additional components and modules.

The computer system 602 can comprise a creative asset management system 614 that carries out the functions, methods, acts, and/or processes described herein. The creative asset management system 614 is executed on the computer system 602 by a central processing unit 606 discussed further below. In some embodiments, the creative asset management system 614 can comprise any and all of the modules described herein.

In general, the word "module," as used herein, refers to logic embodied in hardware or firmware or to a collection of software instructions, having entry and exit points. Modules are written in a program language, such as JAVA, C or C++, PYPHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules but may be represented in hardware or firmware.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 602 includes one or more processing units (CPU) 606, which may comprise a microprocessor. The computer system 602 further includes a physical memory 610, such as random access memory (RAM) for temporary storage of information, a read only memory (ROM) for permanent storage of information, and a mass storage device 604, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 602 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 602 includes one or more input/output (I/O) devices and interfaces 612, such as a keyboard, mouse, touch pad, touchscreen and printer. The I/O devices and interfaces 612 can include one or more display devices, such as a monitor, that allows the visual presentation of data to a user. More particularly, a display device provides for the presentation of GUIs as application software data, and multi-media presentations, for example. The I/O devices and interfaces 612 can also provide a communications interface to various external devices. The computer system 602 may comprise one or more multi-media devices 608, such as speakers, video cards, graphics accelerators, and microphones, for example.

The computing system 602 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 602 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 602 may be controlled by a proprietary operating system. Conventional operating systems control and schedule computer processes for execution, perform memory management, provide file system, networking, and I/O services, and provide a user interface, such as a graphical user interface ("GUI"), among other things.

The computer system 602 illustrated in FIG. 6 is coupled to a network 618, such as a LAN, WAN, or the Internet via a communication link 616 (wired, wireless, or a combination thereof). Network 618 communicates with various computing devices and/or other electronic devices. Network 618 is communicating with one or more computing systems 620 and one or more data sources 622. The creative asset management system 614 may access or may be accessed by computing systems 620 and/or data sources 622 through a web-enabled user access point. Connections may be a direct physical connection, a virtual connection, and other connection type. The web-enabled user access point may comprise a browser module that uses text, graphics, audio, video, and other media to present data and to allow interaction with data via the network 618. The computer system 602 can also be connected to other electronic devices, including for example, satellite communications and augmented and/or virtual reality devices (3D or 2D), which may transmit, for example, GPS information.

Access to the creative asset management system 614 of the computer system 602 by computing systems 620 and/or by data sources 622 may be through a web-enabled user access point such as the computing systems' 620 or data source's 622 personal computer, cellular phone, smartphone, laptop, tablet computer, e-reader device, audio player, or another device capable of connecting to the network 618. Such a device may have a browser module that is implemented as a module that uses text, graphics, audio, video, and other media to present data and to allow interaction with data via the network 618.

The output module may be implemented as a combination of an all-points addressable display such as a cathode ray tube (CRT), a liquid crystal display (LCD), a plasma display, or other types and/or combinations of displays. The output module may be implemented to communicate with input devices 612 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, touch-screen, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 602 may comprise a physical or logical connection established between a remote microprocessor and a mainframe host computer for the express purpose of uploading, downloading, or viewing interactive data and databases on-line in real time. The remote microprocessor may be operated by an entity operating the computer system 602, including the client server systems or the main server system, an/or may be operated by one or more of the data sources 622 and/or one or more of the computing systems 620. In some embodiments, terminal emulation software may be used on the microprocessor for participating in the micro-mainframe link.

In some embodiments, computing systems 620 who are internal to an entity operating the computer system 602 may access the creative asset management system 614 internally as an application or process run by the CPU 606.

In some embodiments, one or more features of the systems, methods, and devices described herein can utilize a URL and/or cookie, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 602 may include one or more internal and/or external data sources (for example, data sources 622). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Those skilled in the art will recognize various means for carrying out these intended features of the embodiments disclosed herein. As such, it is to be understood that other systems, methods, applications and devices may be configured to carry out these features and are therefore considered to be within the scope and intent of the present invention and are anticipated. With respect to the above description, it is to be understood that the embodiments are not limited in their application to the details of construction and to the arrangement of the components in the description or illustrated in the drawings. The embodiments herein described are capable of modification and of being practiced and carried out in various ways which will be obvious to those skilled in the art. Also, it is to be understood that the phraseology and terminology employed herein are for the purpose of description and should not be regarded as limiting.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

The ranges disclosed herein also encompass any and all overlap, sub-ranges, and combinations thereof. Language such as "up to," "at least," "greater than," "less than," "between," and the like includes the number recited and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. Numbers preceded by a term such as "about" or "approximately" include the recited numbers. For example, "about 3 mm" includes "3 mm."

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

The headings provided herein, if any, are for convenience only and do not necessarily affect the scope or meaning of the devices and methods disclosed herein.

What is claimed is:

1. A computer-implemented method for preview, modification, and management of creative assets for diverse advertising platform environments, the computer-implemented method comprising:
componentizing, by a creative asset management system, one or more creative assets, the componentization performed using a machine learning algorithm to automatically determine one or more constituent creative asset components of each of the one or more creative assets and to classify a type of each of the one or more creative asset components, wherein the one or more creative asset components are stored on a creative asset database in electronic communication with the creative asset management system;
retrieving, by the creative asset management system from the creative asset database, the one or more creative asset components;
generating, by the creative asset management system, one or more modified creative assets to be placed on an advertisement impression opportunity based at least in part on the selected and retrieved one or more creative asset components, wherein each of the one or more creative asset components comprises a constituent part of the one or more modified creative assets, and wherein each of the one or more creative asset components comprises one or more component parameters;
attaining, by the creative asset management system from a supply source of the advertisement impression opportunity, one or more supply source rules for the advertisement impression opportunity, wherein each of the one or more supply source rules comprises a predetermined requirement for at least one corresponding component parameter of the one or more creative asset components, wherein the one or more supply source rules are attained from a supply source database comprising a plurality of supply source rules from a plurality of supply sources, and wherein the creative asset management system is configured to periodically update the plurality of supply source rules from the plurality of supply sources;
determining, by the creative asset management system, by comparing the one or more supply source rules with the at least one corresponding component parameter of the one or more creative asset components, a classification of compliance of each of the one or more creative asset components with each of the one or more supply source rules;
dynamically generating, by the creative asset management system, an analysis report for each of the one or more modified creative assets, wherein each analysis report comprises the classification of compliance of each of the one or more creative asset components with each of the one or more supply source rules;
generating, by the creative asset management system, a dynamic user interface;
ranking, via the dynamic user interface of the creative asset management system, the one or more generated creative assets, based at least in part on the classification of compliance of each of the one or more modified creative assets contained in its corresponding generated analysis report;
displaying, via the dynamic user interface of the creative asset management system, the one or more modified creative assets, sorted in an order of determined compliance ranking, the display of the dynamic user interface comprising an option to view the analysis report for each of the one or more modified creative assets;
displaying, via the dynamic user interface of the creative asset management displaying, via the dynamic user interface of the creative asset management system, an option to the user to request to place the one or more modified creative assets on the advertisement impression opportunity when the classification of compliance of each of the one or more modified creative asset components with each of the one or more supply source rules of the dynamically generated analysis report is above a predetermined threshold; and
bidding, through a real-time bidding platform, to place the one or more modified creative assets on the advertisement impression opportunity, wherein the real-time bidding platform is in electronic communication with the creative asset management system,
wherein the creative asset management system comprises a computer processor and an electronic storage medium.

2. The computer-implemented method of claim 1, further comprising determining compliance of the generated one or more modified creative assets with each of the one or more supply source rules, wherein the determining compliance comprises comparing the one or more supply source rules with the at least one corresponding component parameter of the one or more creative asset components.

3. The computer-implemented method of claim 2, wherein the determining compliance of the generated one or more modified creative assets with each of the one or more supply source rules is performed by the creative asset management system.

4. The computer-implemented method of claim 2, wherein the determining compliance of the generated one or more modified creative assets with each of the one or more supply source rules is performed by the supply source.

5. The computer-implemented method of claim 1, further comprising generating a preview of the one or more modified creative assets in a supply source environment, wherein the supply source environment comprises a visual representation of the advertisement impression opportunity of the online location.

6. The computer-implemented method of claim 5, wherein the supply source environment comprises a representation of a selected hardware configuration.

7. The computer-implemented method of claim 1, further comprising transmitting the one or more modified creative assets to the supply source in response to the bidding on the advertisement impression opportunity.

8. The computer-implemented method of claim 1, wherein the real-time bidding platform internally loads the one or more creative asset components and matches at least one creative asset component to a bid request, the match based at least in part on the supply source rules.

9. The computer-implemented method of claim 1, further comprising automatically modifying, by the creative asset management system, at least one of the one or more creative asset components to comply with the one or more supply source rules.

10. The computer-implemented method of claim 9, wherein the modifying comprises altering the size, bitrate, or quality of the at least creative asset components.

11. The computer-implemented method of claim 1, wherein the attaining the one or more supply source rules comprises normalizing supply source rule data into a unified data structure.

12. The computer-implemented method of claim 1, wherein the attaining the one or more supply source rules comprises crawling the supply source.

13. The computer-implemented method of claim 1, wherein the attaining the one or more supply source rules comprises utilizing an application programming interface (API).

14. The computer-implemented method of claim 1, wherein the attaining the one or more supply source rules is completed periodically, continuously, dynamically, in real-time, and/or in substantially real-time.

15. The computer-implemented method of claim 1, wherein the analysis report comprises a projected response rate by consumers for the one or more modified creative assets on the supply source.

16. A computer-implemented method for preview, modification, and management of creative assets for diverse advertising platform environments, the computer-implemented method comprising:
  receiving, by a creative asset management system from a user, one or more creative assets;
  componentizing, by a creative asset management system, the one or more creative assets, the componentization performed using a machine learning algorithm to automatically determine one or more constituent creative asset components of each of the one or more creative assets and to classify a type of each of the one or more creative asset components, wherein the one or more creative asset components are stored on a creative asset database in electronic communication with the creative asset management system;
  receiving, by the creative asset management system, user input to generate one or more new creative assets for placement on one or more advertisement impression opportunities;
  attaining, by the creative asset management system from one or more supply sources of the one or more advertisement impression opportunities, one or more supply source rules associated with one or more advertising platforms for the one or more advertisement impression opportunities, wherein each of the one or more supply source rules comprises a predetermined requirement for at least one corresponding component parameter of the one or more creative asset components, wherein the one or more supply source rules are attained from a supply source database comprising a plurality of supply source rules from a plurality of supply sources, and wherein the creative asset management system is configured to periodically update the plurality of supply source rules from the plurality of supply sources;
  dynamically determining, by the creative asset management system, which of the identified and stored one or more creative asset components complies with the one or more supply source rules for the one or more advertisement impression opportunities by comparing the one or more supply source rules with the at least one corresponding component parameter of the one or more creative asset components to determine a classification of compliance of each of the one or more creative asset components with each of the one or more supply source rules;
  dynamically generating, by the creative asset management system, the one or more new creative assets for placement on the advertisement impression opportunity based at least in part by combining the one or more creative asset components determined to comply with the one or more supply source rules; and
  generating, by the creative asset management system, one or more previews of the one or more dynamically generated new creative assets and displaying, on a dynamic user interface of the creative asset management system, the one or more generated previews to the user;
  displaying, via the dynamic user interface of the creative asset management system, an option to the user to request to place the one or more dynamically generated new creative assets on the advertisement impression opportunity; and
  bidding, through a real-time bidding platform, to place the one or more dynamically generated new creative assets on the one or more advertisement impression opportunities, wherein the real-time bidding platform is in electronic communication with the creative asset management system,
  wherein the creative asset management system comprises a computer processor and an electronic storage medium.

* * * * *